(12) United States Patent
Bendle et al.

(10) Patent No.: US 10,420,134 B2
(45) Date of Patent: Sep. 17, 2019

(54) SYSTEM AND METHOD TO FACILITATE SUBFRAME SCHEDULING IN A SPLIT MEDIUM ACCESS CONTROL RADIO ACCESS NETWORK ENVIRONMENT

(71) Applicant: CISCO TECHNOLOGY, INC., San Jose, CA (US)

(72) Inventors: Ian Neville Bendle, Thatcham (GB); Oliver James Bull, Bristol (GB)

(73) Assignee: Cisco Technology, Inc., San Jose, CA (US)

( * ) Notice: Subject to any disclaimer, the term of this patent is extended or adjusted under 35 U.S.C. 154(b) by 572 days.

(21) Appl. No.: 15/013,844

(22) Filed: Feb. 2, 2016

(65) Prior Publication Data
US 2017/0223701 A1 Aug. 3, 2017

(51) Int. Cl.
H04W 72/12 (2009.01)
H04W 88/08 (2009.01)

(52) U.S. Cl.
CPC ...... H04W 72/1289 (2013.01); H04W 88/085 (2013.01)

(58) Field of Classification Search
CPC .................................................. H04W 72/1289
See application file for complete search history.

(56) References Cited

U.S. PATENT DOCUMENTS

| | | | |
|---|---|---|---|
| 6,141,565 A | 10/2000 | Feuerstein et al. | |
| 6,771,934 B2 | 8/2004 | Demers | |
| 7,151,937 B2 | 12/2006 | Jin et al. | |
| 7,379,739 B2 | 5/2008 | Rajkotia et al. | |
| 7,884,763 B2 | 2/2011 | Na et al. | |
| 7,974,652 B2 | 7/2011 | Gerlach | |
| 7,983,667 B2 | 7/2011 | Hart et al. | |
| 8,045,996 B2 | 10/2011 | Brunner et al. | |

(Continued)

FOREIGN PATENT DOCUMENTS

| | | |
|---|---|---|
| CN | 104684052 A | 6/2015 |
| CN | 105407533 A | 3/2016 |

(Continued)

OTHER PUBLICATIONS

USPTO Jan. 20, 2017 Non-Final Office Action from U.S. Appl. No. 14/852,210.

(Continued)

Primary Examiner — Feben Haile
(74) Attorney, Agent, or Firm — Patterson + Sheridan, LLP

(57) ABSTRACT

A method is provided in one example embodiment and may include receiving a scheduling command for a subframe at a Remote Radio Unit (RRU), wherein the scheduling command provides a subframe configuration for the subframe; determining whether the subframe configuration comprises at least one resource block gap for the subframe; and if the subframe configuration comprises a resource block gap, utilizing the at least one resource block gap to accommodate one or more previously allocated resource blocks for one or more user equipment served by the RRU for which at least one of a previous downlink transmission has failed or a previous uplink grant has been delayed. In some instances, the subframe configuration can be associated with downlink transmissions and uplink transmissions for one or more user equipment served by the RRU.

18 Claims, 9 Drawing Sheets

(56) References Cited

U.S. PATENT DOCUMENTS

| | | |
|---|---|---|
| 8,107,950 B2 | 1/2012 | Amerijoo et al. |
| 8,170,544 B1 | 5/2012 | Satapathy et al. |
| 8,194,630 B2 | 6/2012 | Qvarfordt |
| 8,229,451 B2 | 7/2012 | Frenger et al. |
| 8,275,376 B2 | 9/2012 | Vikberg |
| 8,320,965 B2 | 11/2012 | Kwun |
| 8,340,711 B1 | 12/2012 | Glass et al. |
| 8,400,921 B2 | 3/2013 | Grayson et al. |
| 8,483,743 B2 | 7/2013 | Dimou |
| 8,538,337 B2 | 9/2013 | Damnjanovic |
| 8,588,698 B2 | 11/2013 | Brisebois |
| 8,611,299 B2 | 12/2013 | Yang et al. |
| 8,619,563 B2 | 12/2013 | Madan et al. |
| 8,639,243 B2 | 1/2014 | Radulescu et al. |
| 8,694,044 B2 | 4/2014 | Hiltunen et al. |
| 8,712,459 B2 | 4/2014 | Lim et al. |
| 8,743,772 B2 | 6/2014 | Garavaglia et al. |
| 8,755,791 B2 | 6/2014 | Bontu et al. |
| 8,761,826 B2 | 6/2014 | Brown et al. |
| 8,792,886 B2 | 7/2014 | Meshkati |
| 8,797,983 B2 | 8/2014 | Sun |
| 8,830,936 B2 | 9/2014 | Ren |
| 8,838,125 B2 | 9/2014 | Dalsgaard et al. |
| 8,854,998 B2 | 10/2014 | Johansson et al. |
| 8,862,134 B1 | 10/2014 | Zhou |
| 8,874,126 B2 | 10/2014 | Jeong et al. |
| 8,983,470 B1 | 3/2015 | Ryan |
| 9,014,004 B2 | 4/2015 | Nuss et al. |
| 9,031,591 B2 | 5/2015 | Ma et al. |
| 9,143,995 B2 | 9/2015 | Okmyanskiy et al. |
| 9,148,838 B2 | 9/2015 | Yanover et al. |
| 9,167,444 B2 | 10/2015 | Nuss et al. |
| 9,219,816 B2 | 12/2015 | Grayson |
| 9,510,237 B2 | 11/2016 | Nuss et al. |
| 2004/0085909 A1 | 5/2004 | Soliman |
| 2005/0064820 A1 | 3/2005 | Park et al. |
| 2005/0215251 A1 | 9/2005 | Krishnan |
| 2005/0282572 A1 | 12/2005 | Wigard et al. |
| 2006/0068712 A1 | 3/2006 | Kroboth et al. |
| 2006/0073791 A1 | 4/2006 | Senarath |
| 2006/0229087 A1 | 10/2006 | Davis et al. |
| 2007/0008885 A1 | 1/2007 | Bonner |
| 2007/0253372 A1 | 11/2007 | Nakayasu |
| 2007/0280170 A1 | 12/2007 | Kawasaki |
| 2008/0107074 A1 | 5/2008 | Salmenkaita et al. |
| 2008/0139197 A1 | 6/2008 | Misra et al. |
| 2008/0188265 A1 | 8/2008 | Carter et al. |
| 2008/0268833 A1 | 10/2008 | Huang |
| 2009/0054047 A1 | 2/2009 | Kylvaja |
| 2009/0092088 A1 | 4/2009 | Kokku |
| 2009/0129284 A1 | 5/2009 | Jung et al. |
| 2009/0129291 A1 | 5/2009 | Gupta |
| 2009/0232074 A1 | 9/2009 | Yang et al. |
| 2009/0323530 A1 | 12/2009 | Trigui et al. |
| 2010/0009634 A1 | 1/2010 | Budianu |
| 2010/0029282 A1 | 2/2010 | Stamoulis et al. |
| 2010/0034157 A1 | 2/2010 | Stolyar et al. |
| 2010/0056184 A1 | 3/2010 | Vakil |
| 2010/0093358 A1 | 4/2010 | Cheong et al. |
| 2010/0099424 A1 | 4/2010 | Centonza |
| 2010/0112982 A1 | 5/2010 | Singh et al. |
| 2010/0177722 A1 | 7/2010 | Guvenc |
| 2010/0227611 A1 | 9/2010 | Schmidt et al. |
| 2010/0240314 A1 | 9/2010 | Chang |
| 2010/0260036 A1 | 10/2010 | Molnar et al. |
| 2010/0260068 A1 | 10/2010 | Bhatt et al. |
| 2010/0267408 A1 | 10/2010 | Lee et al. |
| 2010/0275083 A1 | 10/2010 | Nam et al. |
| 2010/0279628 A1 | 11/2010 | Love et al. |
| 2010/0311449 A1 | 12/2010 | Whinnett |
| 2010/0317351 A1 | 12/2010 | Gerstenberger |
| 2011/0039539 A1 | 2/2011 | Wada et al. |
| 2011/0039570 A1 | 2/2011 | Maida et al. |
| 2011/0077016 A1 | 3/2011 | Stolyar et al. |
| 2011/0086614 A1 | 4/2011 | Brisebois |
| 2011/0201277 A1 | 4/2011 | Eguchi |
| 2011/0110316 A1 | 5/2011 | Chen et al. |
| 2011/0128862 A1 | 6/2011 | Kallin |
| 2011/0134856 A1* | 6/2011 | Seo ............ H04L 1/0071 |
| | | 370/329 |
| 2011/0136478 A1 | 6/2011 | Trigui |
| 2011/0151877 A1 | 6/2011 | Tafreshi |
| 2011/0176497 A1 | 7/2011 | Gopalakrishnan |
| 2011/0182375 A1 | 7/2011 | Kim et al. |
| 2011/0195730 A1 | 8/2011 | Chami |
| 2011/0211514 A1 | 9/2011 | Hamalainin |
| 2011/0223964 A1 | 9/2011 | Ebiko |
| 2011/0235598 A1 | 9/2011 | Hilborn |
| 2011/0250881 A1 | 10/2011 | Michel et al. |
| 2011/0287755 A1 | 11/2011 | Cho |
| 2012/0004003 A1 | 1/2012 | Shaheen et al. |
| 2012/0015655 A1 | 1/2012 | Lee |
| 2012/0028584 A1 | 2/2012 | Zhang et al. |
| 2012/0046026 A1 | 2/2012 | Chande |
| 2012/0046063 A1 | 2/2012 | Chande |
| 2012/0083201 A1 | 4/2012 | Truong |
| 2012/0087247 A1 | 4/2012 | Min et al. |
| 2012/0100849 A1 | 4/2012 | Marisco |
| 2012/0129537 A1 | 5/2012 | Liu et al. |
| 2012/0176980 A1 | 7/2012 | Moon et al. |
| 2012/0178451 A1 | 7/2012 | Kubota |
| 2012/0231797 A1 | 9/2012 | Van Phan et al. |
| 2012/0235774 A1 | 9/2012 | Guey et al. |
| 2012/0238263 A1 | 9/2012 | Caretti et al. |
| 2012/0243461 A1 | 9/2012 | Bucknell |
| 2012/0258720 A1 | 10/2012 | Tinnakornsurisphap et al. |
| 2012/0265888 A1 | 10/2012 | Roeland et al. |
| 2012/0282964 A1 | 11/2012 | Xiao et al. |
| 2013/0003697 A1 | 1/2013 | Adjakple et al. |
| 2013/0005388 A1 | 1/2013 | Naka |
| 2013/0021962 A1 | 1/2013 | Hu et al. |
| 2013/0077482 A1 | 3/2013 | Krishna et al. |
| 2013/0079007 A1 | 3/2013 | Nagaraja et al. |
| 2013/0088983 A1 | 4/2013 | Pragada |
| 2013/0107798 A1 | 5/2013 | Gao et al. |
| 2013/0136072 A1 | 5/2013 | Bachmann et al. |
| 2013/0137447 A1 | 5/2013 | Zhang et al. |
| 2013/0142116 A1 | 6/2013 | Prakash |
| 2013/0163543 A1 | 6/2013 | Freda et al. |
| 2013/0182680 A1 | 7/2013 | Choi et al. |
| 2013/0210431 A1 | 8/2013 | Abe |
| 2013/0229945 A1 | 9/2013 | Cha et al. |
| 2013/0242748 A1 | 9/2013 | Mangalvedhe et al. |
| 2013/0250875 A1 | 9/2013 | Chen et al. |
| 2013/0294356 A1 | 11/2013 | Bala et al. |
| 2013/0308531 A1 | 11/2013 | So et al. |
| 2013/0310103 A1 | 11/2013 | Madan et al. |
| 2013/0326001 A1 | 12/2013 | Jorgensen et al. |
| 2013/0331079 A1 | 12/2013 | Racz et al. |
| 2013/0337821 A1 | 12/2013 | Clegg |
| 2013/0339783 A1 | 12/2013 | Alonso et al. |
| 2013/0343304 A1 | 12/2013 | Kaippallimalil et al. |
| 2013/0343755 A1 | 12/2013 | Cvijetic et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0018073 A1 | 1/2014 | Frenger |
| 2014/0018090 A1 | 1/2014 | Khoryaev |
| 2014/0029524 A1 | 1/2014 | Dimou et al. |
| 2014/0031049 A1 | 1/2014 | Sundaresan |
| 2014/0056220 A1 | 2/2014 | Poitau et al. |
| 2014/0073304 A1 | 3/2014 | Brisebois |
| 2014/0078986 A1 | 3/2014 | Kaippallimalil et al. |
| 2014/0086226 A1 | 3/2014 | Zhao et al. |
| 2014/0092765 A1 | 4/2014 | Agarwal et al. |
| 2014/0112251 A1 | 4/2014 | Kim et al. |
| 2014/0146732 A1 | 5/2014 | Olufunmilola et al. |
| 2014/0148179 A1 | 5/2014 | Das et al. |
| 2014/0153439 A1 | 6/2014 | Nuss et al. |
| 2014/0155081 A1 | 6/2014 | Nuss |
| 2014/0155109 A1 | 6/2014 | Vaidya et al. |
| 2014/0169409 A1 | 6/2014 | Ma et al. |
| 2014/0185467 A1 | 7/2014 | Heo |
| 2014/0194127 A1 | 7/2014 | Wang |

(56) References Cited

U.S. PATENT DOCUMENTS

| | | |
|---|---|---|
| 2014/0198678 A1 | 7/2014 | Kim et al. |
| 2014/0211739 A1 | 7/2014 | Kim et al. |
| 2014/0213274 A1 | 7/2014 | Weber et al. |
| 2014/0219117 A1 | 8/2014 | Meshkati et al. |
| 2014/0220990 A1 | 8/2014 | Lorca Hernando |
| 2014/0226481 A1 | 8/2014 | Dahod |
| 2014/0233479 A1 | 8/2014 | Dahod |
| 2014/0241316 A1 | 8/2014 | Okmyanskiy et al. |
| 2014/0243005 A1 | 8/2014 | Yanover et al. |
| 2014/0269355 A1 | 9/2014 | Monogioudis et al. |
| 2014/0274195 A1 | 9/2014 | Singh |
| 2014/0286256 A1 | 9/2014 | Chowdhury |
| 2014/0293906 A1 | 10/2014 | Chang et al. |
| 2014/0321282 A1 | 10/2014 | Pragada |
| 2014/0328277 A1 | 11/2014 | Xiao et al. |
| 2014/0335909 A1 | 11/2014 | Czerepinski |
| 2015/0011222 A1 | 1/2015 | Brisebois et al. |
| 2015/0018028 A1 | 1/2015 | Uplenchwar et al. |
| 2015/0038190 A1 | 2/2015 | Carter et al. |
| 2015/0055479 A1 | 2/2015 | Reider |
| 2015/0063166 A1 | 3/2015 | Sif |
| 2015/0063223 A1 | 3/2015 | Shen |
| 2015/0063231 A1 | 3/2015 | Seo et al. |
| 2015/0078162 A1 | 3/2015 | Prakash et al. |
| 2015/0087325 A1 | 3/2015 | Nuss et al. |
| 2015/0138981 A1 | 5/2015 | Nuss et al. |
| 2015/0141027 A1 | 5/2015 | Tsui et al. |
| 2015/0146594 A1 | 5/2015 | Grayson et al. |
| 2015/0148036 A1 | 5/2015 | Grayson et al. |
| 2015/0208425 A1 | 7/2015 | Caretti et al. |
| 2015/0215918 A1 | 7/2015 | Wu |
| 2015/0256314 A1 | 9/2015 | Gauvreau et al. |
| 2015/0288767 A1 | 10/2015 | Fargano |
| 2015/0289167 A1 | 10/2015 | Alex |
| 2015/0312778 A1 | 10/2015 | Chandrasekhar et al. |
| 2015/0318994 A1 | 11/2015 | Walsh et al. |
| 2015/0341941 A1 | 11/2015 | Nguyen |
| 2015/0351072 A1 | 12/2015 | Okmyanskiy et al. |
| 2015/0365934 A1 | 12/2015 | Liu |
| 2015/0373698 A1 | 12/2015 | Uplenchwar et al. |
| 2015/0382242 A1 | 12/2015 | Sunavala |
| 2015/0382367 A1 | 12/2015 | Yanover et al. |
| 2016/0020822 A1* | 1/2016 | Li .............. H04B 1/715 375/133 |
| 2016/0037550 A1 | 2/2016 | Barabell |
| 2016/0043944 A1 | 2/2016 | Felstaine |
| 2016/0100330 A1 | 4/2016 | Broustis |
| 2016/0191345 A1 | 6/2016 | Despotovic |
| 2016/0242147 A1 | 8/2016 | Tarlazzi |
| 2016/0277953 A1 | 9/2016 | Andersson |
| 2016/0344587 A1 | 11/2016 | Hoffman |
| 2017/0019811 A1 | 1/2017 | Parulkar |
| 2017/0325225 A1* | 11/2017 | Dinan .............. H04W 72/0446 |

FOREIGN PATENT DOCUMENTS

| | | |
|---|---|---|
| EP | 1322048 | 6/2003 |
| EP | 1718090 | 11/2006 |
| EP | 1895801 | 3/2008 |
| EP | 2296394 | 3/2011 |
| EP | 2337395 | 6/2011 |
| EP | 2395701 | 12/2011 |
| EP | 2445265 | 4/2012 |
| EP | 2466972 | 6/2012 |
| EP | 2533595 | 12/2012 |
| EP | 2632072 | 8/2013 |
| EP | 2728926 | 5/2014 |
| EP | 2741533 | 6/2014 |
| EP | 2306761 | 7/2014 |
| EP | 2832150 | 2/2015 |
| EP | 2879444 | 6/2015 |
| EP | 2996422 | 3/2016 |
| EP | 3119036 | 1/2017 |
| GB | 2496908 | 5/2013 |
| GB | 2518584 | 4/2015 |
| WO | WO1998/024199 | 6/1998 |
| WO | WO2000/038351 | 6/2000 |
| WO | WO2007/074373 | 7/2007 |
| WO | WO2007/133135 | 11/2007 |
| WO | WO2010/006909 | 1/2010 |
| WO | WO2010/064110 | 6/2010 |
| WO | WO2010/125151 | 11/2010 |
| WO | WO2011/085238 | 7/2011 |
| WO | WO2011/088465 | 7/2011 |
| WO | WO2011/090908 | 7/2011 |
| WO | WO2011/137345 | 11/2011 |
| WO | WO2012/148009 | 1/2012 |
| WO | WO2012/055984 | 5/2012 |
| WO | WO2012/079604 | 6/2012 |
| WO | WO2013/005016 | 1/2013 |
| WO | WO2013/006769 | 1/2013 |
| WO | WO2013/041574 | 3/2013 |
| WO | WO2013/079913 | 6/2013 |
| WO | WO2013/082245 | 6/2013 |
| WO | WO2013/086659 | 6/2013 |
| WO | WO2013/112082 | 8/2013 |
| WO | WO2013/144950 | 10/2013 |
| WO | WO2013/169991 | 11/2013 |
| WO | WO2014/001025 | 3/2014 |
| WO | WO2014/051630 | 4/2014 |
| WO | WO2014/059935 | 4/2014 |
| WO | WO2014/071308 | 5/2014 |
| WO | WO2014/087393 | 6/2014 |
| WO | WO2014/087394 | 6/2014 |

OTHER PUBLICATIONS

USPTO Jan. 9, 2017 Non-Final Office Action from U.S. Appl. No. 14/803,475.

EPO Oct. 24, 2016 Extended Search Report and Written Opinion of the International Searching Authority from European Application No. 16178746.

"ETSI TR 136 902 V9.3.1 (May 2011) Technical Report: LTE; Evolved Universal Terrestrial Radio Access Network 9E-UTRAN); Self-configuring and self-optimizing network (SON) use cases and solutions (3GPP TR 36.902 version 9.3.1 Release 9)," ETSI, European Telecommunications Standards Institute, 650 Route des Lucioles F-06921 Sophia Antipolis Cedex—France, May 2011; 23 pages.

"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex—France, Oct. 2014; 93 pages.

"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex—France, Jun. 2010; See Section 4, pp. 15-46.

"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex—France, Jul. 2014.

"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex—France, Sep. 2014; 308 pages.

"ETSI TS 123 401 V12.70 (Jan. 2015) Technical Specification: LTE; General Packet Radio Service (GPRS) enhancements for Evolved Universal Terrestrial Radio Access Network (E-UTRAN) access (EGPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.

(56) References Cited

OTHER PUBLICATIONS

"ETSI TS 125 133 V12.6.0 (Jan. 2013) Technical Specification: Universal Mobile Telecommunications System 9UMTS); Requirements for support of radio resource management (FDD) (3GPP TS 25.133 version 12.6.0 Release 12);" ETSI, European Telecommunications Standards Institute 2012, 650 Route des Lucioles, F-06921 Sophia Antipolis Cedex—France, Jan. 2015; 368 pages.
"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex—France, Jul. 2014.
"ETSI TS 125 215 V 12.0.0 (Sep. 2014) Technical Specification: Universal Mobile Telecommunications System (UMTS); Physical layer; Measurements (FDD) (3GPP TS 25.215 version 12.0.0 Release 12);" ETSI, European Telecommunications Standards Institute 2012, 650 Route des Lucioles, F-06921 Sophia Antipolis Cedex—France, Sep. 2014; 26 pages.
"ETSI TS 125 224 V12.0.0 (Sep. 2014) Technical Specification: Universal Mobile Telecommunications System (UMTS); Physical layer procedures (TDD) (3GPP TS 25.224 version 12.0.0 Release 12);" ETSI, European Telecommunications Standards Institute 2012, 650 Route des Lucioles, F-06921 Sophia Antipolis Cedex—France, Sep. 2014; 86 pages.
"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex—France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8-8.3.9 pp. 289-292; §8.5.21 pp. 357-365; §10.2.7 pp. 620-623; Annex B.3 pp. 2045-2052] .
"ETSI TS 125 367 V9.4.0, Universal Mobile Telecommunications System (UMTS); Mobilityprocedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.
"ETSI TS-125-469 V9.3.0 (Oct. 2010) Technical Specification: Universal Mobile Telecommunications System (UMTS); UTRAN luh interface Home Node B (HNG) Application Part (HNBAP) signaling (3GPP TS 25.469 version 9.3.0 Release 9)," © European Telecommunications Standards Institute 2010; Oct. 2010; 64 pages.
"ETSI TS 125 469 v11.2.0, Universal Mobile Telecommunications System (UMTS); UTRAN luh interface Home Node B (HNB); Application Part (HNBAP) signalling (3GPP TS25.469 version 11.2.0 Release 11)," European Telecommunications Standards Institute, 650 Route des Lucioles, F-06921 Sophia Antipolis Cedex, France, Apr. 2013, 78 pages.
"ETSI TS 128 657 V11.0.0 (Feb. 2013) Technical Specification: Universal Mobile Telecommunications System 9UMTS); LTE; Telecommunication management; Evolved Universal Terrestrial Radio Access Network 9E-UTRAN) Network Resource Model (NRM); Integration Reference Point (IRP); Requirements (3GPP TS 28.657 version 11.0.0 Release 11)," ETSI, European Telecommunications Standards Institute 2012, 650 Route des Lucioles, F-06921 Sophia Antipolis Cedex—France, Feb. 2013; 9 pages.
"ETSI TS 128 658 V11.0.0 (Feb. 2013) Technical Specification: Universal Mobile Telecommunications System 9UMTS); LTE; Telecommunication management; Evolved Universal Terrestrial Radio Access Network (E-UTRAN) Network Resource Model (NRM) Integration Reference Point (IRP); Information Service (IS) (3GPP TS 28.658 version 11.0.0 Release 11)," ETSI, European Telecommunications Standards Institute 2012, 650 Route des Lucioles, F-06921 Sophia Antipolis Cedex—France, Feb. 2013; 53 pages.
"ETSI TS 128 659 V11.0.0 (Jan. 2013) Technical Specification: Universal Mobile Telecommunications Systems (UMTS); LTE; Telecommunications Management; Evolved Universal Terrestrial Radio Access Network (E-UTRAN) Network Resource Model (NRM) Integration Reference Point (IRP); Solution Set (SS) definitions (3GPP TS 28.659 version 11.0.0 Release 11)," ETSI, European Telecommunications Standards Institute 2012, 650 Route des Lucioles, F-06921 Sophia Antipolis Cedex—France, Jan. 2013; 48 pages.
"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex—France, Oct. 2014; 170 pages.
"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Lucioles, F-06921, Sophia Antipolis Cedex—France, Oct. 2014, 232 pages.
"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12),"[Relevant Sections 3, 4, 8 and 8 only], ETSI, 650 Route des Lucioles, F-06921, Sophia Antipolis Cedex—France, Oct. 2014.
"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex—France, Oct. 2014; 64 pages.
"ETSI TS 136 111 V12.0.0 (Oct. 2014) Technical Specification: LTE; Location Measurement Unit (LMU) performance specification; Network based positioning systems in Evolved Universal Terrestrial Radio Access Network (E-UTRAN) (3GPP TS 36.111 version 12.0.0 Release 12);" ETSI, European Telecommunications Standards Institute 2012, 650 Route des Lucioles, F-06921 Sophia Antipolis Cedex—France; Oct. 2014.
"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex—France, Nov. 2014.
"ETSI TS 136 133 V12-9-0 (Oct. 2015) Technical Specification: LTE; Evolved Universal Terrestrial Radio Access (E-UTRA); Requirements for support of Radio Resource management (3GPP TS 36.133 version 12.9.0 Release 12)," ETSI, European Telecommunications Standards Institute, 650 Route des Lucioles F-06921 Sophia Antipolis Cedex—France, Oct. 2015 [Sections 1 thru 9 only]; 252 pages.
"ETSI TS 136 201 V12.1.0 (Feb. 2015) Technical Specificaton: LTE; Evolved Universal Terrestrial Radio Access (E-UTRA); LTE physical layer; General description (3GPP TS 36.201 version 12.1.0 Release 12);" ETSI, European Telecommunications Standards Institute 2012, 650 Route des Lucioles, F-06921 Sophia Antipolis Cedex—France, Feb. 2015; 15 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12);" ETSI, European Telecommunications Standards Institute, 650 Route des Lucioles F-06921 Sophia Antipolis Cedex—France; Apr. 2015.
"ETSI TS 136 213 V12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Lucioles, F-06921 Sophia Antipolis Cedex—France, Feb. 2015; 227 pages.
"ETSI TS 136 213 V12.7.0 (Oct. 2015) Technical Specification: LTE; Evolved Universal Terrestrial Radio Access (E-UTRA); Physical layer procedures (3GPP TS 36.213 version 12.7.0 Release 12);" ETSI, European Telecommunications Standards Institute, 650 Route des Lucioles F-06921 Sophia Antipolis Cedex—France, Oct. 2015; 243 pages.

(56) References Cited

OTHER PUBLICATIONS

"ETSI TS 136 213 V9.3.0 (Oct. 2010) Technical Specification: LTE; Evolved Universal Terrestrial Radio Access (E-UTRA); Physical layer procedures (3GPP TS 36.213 version 9.3.0 Release 9);" ETSI, European Telecommunications Standards Institute 2012, 650 Route des Lucioles, F-06921 Sophia Antipolis Cedex—France; Oct. 2010.
"ETSI TS 136 214 V9.2.0 (Jun. 2010) Technical Specification: LTE; Evolved Universal Terrestrial Radio Access (E-UTRA); Physical layer; Measurements (3GPP TS 36.214 version 9.2.0 Release 9);" ETSI, European Telecommunications Standards Institute 2012, 650 Route des Lucioles, F-06921 Sophia Antipolis Cedex—France; Jun. 2010.
"ETSI TS 136 300 V12-7-0 (Oct. 2015) Technical Sepcification: LTE; Evolved Universal Terrestrial Radio Access (E-UTRA) and Evolved Universal Terrestrial Radio Access Network (E-UTRAN); Overall description; Stage 2 (3GPP TS 36.300 version 12.7.0 Release 12);" ETSI, European Telecommunications Standards Institute, 650 Route des Lucioles F-06921 Sophia Antipolis Cedex—France, Oct. 2015; 264 pages.
"ETSI TS 136 304 V12-6-0 (Nov. 2015) Technical Specification: LTE; Evolved Universal Terrestrial Radio Access (E-UTRA); User Equipment (UE) procedures in idle mode (3GPP TS 36.304 version 12.6.0 Release 12);" ETSI, European Telecommunications Standards Institute, 650 Route des Lucioles F-06921 Sophia Antipolis Cedex—France, Nov. 2015; 40 pages.
"ETSI TS 136 321 V12.7.0 (Oct. 2015) Technical Specification: LTE; Evolved Universal Terrestrial Radio Access (E-UTRA); Medium Access Control (MAC) protocol specification (3GPP TS 36.321 version 12.7.0 Release 12);" ETSI, European Telecommunications Standards Institute, 650 Route des Lucioles F-06921 Sophia Antipolis Cedex—France, Oct. 2015; 79 pages.
"ETSI TS 136 331 V12.3.0 (Sep. 2014) Technical Specification: LTE; Evolved Universal Terrestrial Radio Access (E-UTRA); Radio Resource Control (RRC); Protocal specification (3GPP TS 36.311 version 12.3.0 Release 12)," [Relevant Section 5.3.2 only]; ETSI, 650 Route des Lucioles F-06921 Sophia Antipolis Cedex—France, Sep. 2014.
"ETSI TS 136 331 V12.7.0 (Oct. 2015) Technical Specification: LTE; Evolved Universal Terrestrial Radio Access (E-UTRA); Radio Resource Control (RCC); Protocol Specification (3GPP TS 36.331 version 12.7.0 Release 12);" ETSI, European Telecommunications Standards Institute, 650 Route des Lucioles F-06921 Sophia Antipolis Cedex—France, Oct. 2015; 455 pages.
"ETSI TS 136 423 V8.3.0 (Nov. 2008) Technical Specification: LTE; Evolved Universal Terrestrial Radio Access Network (E-UTRAN); X2 Application Protocol (X2AP) (3GPP TS 36.423 version 8.3.0 Release 8);" ETSI, European Telecommunications Standards Institute 2012, 650 Route des Lucioles, F-06921 Sophia Antipolis Cedex—France; Nov. 2008.
"ETSI TS 136 211 V12.4.0 (Feb. 2015) Technical Specification: LTE; Evolved Universal Terrestrial Radio Access (E-UTRA); Physical channels and modulation (3GPP TS 36.211 version 12.4.0 Release 12);" ETSI, European Telecommunications Standards Institute 2012, 650 Route des Lucioles, F-06921 Sophia Antipolis Cedex—France, Feb. 2015; 126 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12)," ETSI, European Telecommunications Standards Institute 2012, 650 Route des Lucioles, F-06921 Sophia Antipolis Cedex—France, Apr. 2015; 139 pages.
"ETSI TS 136 212 V12.3.0 (Feb. 2015) Technical Specification: LTE; Evolved Universal Terrestrial Radio Access (E-UTRA); Multiplexing and channel coding (3GPP TS 36.212 version 12.3.0 Release 12);" ETSI, European Telecommunications Standards Institute 2012, 650 Route des Lucioles, F-06921 Sophia Antipolis Cedex—France, Feb. 2015; 91 pages.
"ETSI TS 136 212 V12.6.0 (Oct. 2015) Technical Specification: LTE; Evolved Universal Terrestrial Radio Access (E-UTRA); Multiplexing and channel coding (3GPP TS 36.212 version 12.6.0 Release 12);" ETSI, European Telecommunications Standards Institute, 650 Route des Lucioles F-06921 Sophia Antipolis Cedex—France, Oct. 2015; 96 pages.
"ETSI TS 136 214 V10.1.0 (Apr. 2011) Technical Specification: LTE; Evolved Universal Terrestrial Radio Access (E-UTRA); Physical layer; Measurements (3GPP TS 36.214 version 10.1.0 Release 10);" ETSI, European Telecommunications Standards Institute 2012, 650 Route des Lucioles, F-06921 Sophia Antipolis Cedex—France, Apr. 2011; 15 pages.
"ETSI TS 136 300 V10.2.0 (Jan. 2011) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0 Release 10)," ETSI, European Telecommunications Standards Institute 2012, 650 Route des Lucioles, F-06921 Sophia Antipolis Cedex—France, Jan. 2011; 208 pages.
"ETSI TS 136 300 V12.4.0 (Feb. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.4.0 Release 12);" ETSI, European Telecommunications Standards Institute 2012, 650 Route des Lucioles, F-06921 Sophia Antipolis Cedex—France, Feb. 2015; 266 pages.
"ETSI TS 136 423 V11.3.0 (Jan. 2013) Technical Specification: LTE; Evolved Universal Terrestrial Radio Access Network (E-UTRAN); X2 Application Protocol (X2AP) (3GPP TS 36.423 version 11.3.0 Release 11)," ETSI, European Telecommunications Standards Institute 2012, 650 Route des Lucioles, F-06921 Sophia Antipolis Cedex—France, Jan. 2013; 143 pages.
"ETSI TS 136 423 V12.4.2 (Feb. 2015) Technical Specification: LTE; Evolved Universal Terrestrial Radio Access Network (E-UTRAN); X2 Application Protocol (X2AP) (3GPP TS 36.423 version 12.4.2 Release 12);" ETSI, European Telecommunications Standards Institute 2012, 650 Route des Lucioles, F-06921 Sophia Antipolis Cedex—France, Feb. 2015; 205 pages.
"ETSI GS NFV 002 V1.1.1 (Oct. 2013) Group Specification: Network Functions Virtualisation (NFV); Architectural Framework," ETSI, European Telecommunications Standards Institute, 650 Route des Lucioles F-06921 Sophia Antipolis Cedex—France, Oct. 2013; 21 pages.
"3GPP LTE Packet Data Convergence Protocol (PDCP) Sub Layer," EventHelix.com Inc., first published on or about Jan. 1, 2010; 20 pages.
"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex—France, May 2014, 64 pages.
"3GPP TR 36.814 V9.0.0 (Mar. 2010) Technical Report: 3rd Generation Partnership Project; Technical Specification Group Radio Access Network; Evolved Universal Terrestrial Radio Access (E-UTRA); Further advancements for E-UTRA physical layer aspects (Release 9);" 3rd Generation Partnership Project (3GPP), Mar. 2010.
"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.
"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.
"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex—France, Jun. 2014; See Sections 1-5, pp. 11-76.
"3GPP TS 23.060 V13.0.0 (Sep. 2014) Technical Specification: 3rd Generation Partnership Project; Technical Specification Group Ser-

(56) References Cited

OTHER PUBLICATIONS vices and System Aspects; General Packet Radio Service (GPRS); Service description; Stage 2 (Release 13)," [Relevant Sections 5.3.20 and 6.2.3 only]; 3rd Generation Partnership Project; Sep. 2014.
"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.
"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.
"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.
"3GPP TS 25.367 V11.0.0 (Jun. 2012) Technical Specification: Group Radio Access Network; Mobility procedures for Home Node B (HNG); Overall description; Stage 2 (Release 11)," 3rd Generation Partnership Project, Mobile Competence Centre; 650, Route Des Lucioles; F-06921 Sophia-Antipolis Cedex; France; Jun. 2012, 14 pages.
"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex—France, Jul. 2014; Section 4, pp. 17-88.
"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release12)," [Relevant Sections 5 and 7.3.1-7.3.21 only]; 3rd Generation Partnership Project; Sep. 2014.
"3GPP TS 29-274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.
"3GPP TS 32.522 v11.2.0, 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.
"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.
"3GPP TS 36.300 V11.3.0 (Sep. 2012) Technical Specification: Group Radio Access Network; Evolved Universal Terrestrial Radio Access (E-UTRA) and Evolved Universal Terrestrial Radio Access Network (E-UTRAN); Overall Description; Stage 2 (Release 11)," 3rd Generation Partnership Project, Mobile Competence Centre; 650, Route Des Lucioles; F-06921 Sophia-Antipolis Cedex; France; Sep. 2012, 205 pages.
"3GPP TS 36.413 V9.5.1 (Jan. 2011)Technical Specification: 3rd Generation Partnership Project; Technical Specification Group Radio Access Network; Evolved Universal Terrestrial Radio Access Network (E-UTRAN); S1 Application Protocol (S1AP) (Release 9);" 3rd Generation Partnership Project, Jan. 2011.
"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.
"3GPP TS 37.320 V11.1.0 (Sep. 2012) Technical Specification: Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)," 3rd Generation Partnership Project, Mobile Competence Centre; 650, Route Des Lucioles; F-06921 Sophia-Antipolis Cedex; France; Sep. 2012, 21 pages.
"3GPP TS 48.008 V8.8.0 (Dec. 2009) Technical Specification: 3rd Generation Partnership Project; Technical Specification Group GSM/EDGE Radio Access Network; Mobile Switching Centre—Base Station System (MSC-BSS) interface; Layer 3 specification (Release 8);" 3rd Generation Partnership Project, Mobile Competence Centre; 650, Route Des Lucioles; F-06921 Sophia-Antipolis Cedex; France; Dec. 2009; 208 pages.
"3GPP Draft TR_R3018_V_100 (Oct. 2007) Technical Specification: Group Radio Access Network; Evolved UTRA and UTRAN; Radio Access Architecture and Interfaces (Release 7)," 3rd Generation Partnership Project, Mobile Competence Centre; 650, Route Des Lucioles; F-06921 Sophia-Antipolis Cedex; France; Oct. 2007, XP050423659.
3GPP TSG-RAN WG3 #61bis, R3-081174, "Solution for interference reduction SON use case," Orange, Alcatel-Lucent, Agenda Item 10.1.1c; Kansas City, MO, USA, May 5-9, 2008; 6 pages.
3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.
3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.
"4G++: Advanced Performance Boosting Techniques in 4th Generation Wireless Systems; A National Telecommunication Regulatory Authority Funded Project; Deliverable D4.1, Work Package 4, Inter-Cell Interference Coordination," 4G++Project, Funded by the Egyptian National Telecommunications Regulatory Authority (NTRA); 75 pages First Published on or about Sep. 15, 2015.
Adrangi, F., et al., "Chargeable User Identity," Network Working Group RFC 4372, Jan. 2006, 10 pages.
Andrews, Matthew, et al., "Optimal Utility Based Multi-User Throughput Allocation Subject to Throughput Constraints," IEEE INFOCOM 2005, Mar. 13-17, 2005, Miami, FL; 10 pages.
Ashraf, Imran, "Distributed Radio Coverage Optimization in Enterprise Femtocell Networks," International Conference on Communications ICC 2010, May 23-27, 2010, Cape Town, South Africa; 6 pages.
Baid, Akash, et al., "Delay Estimation and Fast Iterative Scheduling Policies for LTE Uplink," HAL archives-ouvertes; HAL Id: hal-00763374, Submitted on Dec. 10, 2012; 9 pages; https://hal.inria.fr/hal-00763374.
Basir, Adnan, "3GPP Long Term Evolution (LTE), ICIC and eICIC," posted Jun. 11, 2012; 5 pages; http://4g-lte-world-blogspot.com/2012/06/icic-and-eicic.html.
"Bisection Method," Wikipedia, the free encyclopedia, Aug. 26, 2015; 5 pages.
"Block Error Ratio (BLER) Measurement Description," Keysight Technologies, Feb. 28, 2014; 3 pages http://rfmw.em.keysight.com/rfcomms/refdocs/wcdma/wcdma_meas_wblerror_desc.html.
"Broadband Forum Technical Report: TR-069 CPE WAN Management Protocol," Issue: 1, Amendment 4, Issue Date: Jul. 2011 Protocol Version 1.3; © The Broadband Forum; 190 pages.
"Broadband Forum Technical Report: TR-069 CPE WAN Management Protocol," Issue: 1, Amendment 5, Issue Date: Nov. 2013 CWMP Version 1.4; © The Broadband Forum; 228 pages.

(56) References Cited

OTHER PUBLICATIONS

"Broadband Forum Technical Report: TR-196 Frmto Access Point Service Data Model," Issue: 2, Issue Date: Nov. 2011; 46 pages.
Calhoun, P., "Diameter Base Protocol," Network Working Group RFC 3488, Sep. 2003; 147 pages.
Chauhan, Himanshu, "UE Measurements and Reporting in UMTS," Wireless Technologies, Blog dated Apr. 26, 2013; 3 pages http://worldtechieumts.blogspot.com/2013/04/ue-measurements-and-reporting-in-umts.html.
"Cisco ASR 5000 Series Small Cell Gateway," Cisco White Paper, C11-711704-00, Jul. 2012, Cisco Systems, Inc., Printed in USA, © 2012 Cisco and/or its affiliates. All Rights Reserved. 6 pages.
"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.
"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.
Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.
Do, Dr. Michelle M., et al., "Interference Coordination in LTE/LTE-A (2): eICIC (enhanced ICIC)," Netmanias Tech Blog, Aug. 6, 2014; 6 pages http://www.netmanias.com/en/post/blog/6551/lte-lte-a-eicic/interference-coordination-in-lte-lte-a-2-eicic-enhanced-icic.
Droms, R., "Dynamic Host Configuration Protocol," Network Working Group RFC 2131, Mar. 1997; 45 pages.
"Extensible Authentication Protocol," Wikipedia, the free encyclopedia, 10 pages [Retrieved and printed Oct. 11, 2013] http://en.wikipedia.org/wiki/Extensible_Authentication_Protocol#EAP-FAST.
Ericsson, "R4-153549: Agenda Item 7.9.3.1—SFN and subframe offset reporting for dual connectivity," 3GPP TSG RAN WG4 Meeting #75, Fukuoka, Japan, May 25-29, 2015.
"Frame Structure—Downlink," Share Technote, first published on or about Jul. 9, 2012; 13 pages; http://www.sharetechnote.com/html/FrameStructure_DL_html.
"Fuzzy Logic," from Wikipedia, the free encyclopedia, Dec. 3, 2015; 12 pages.
Freescale Semiconductor, "Long Term Evolution Protocol Overview," White Paper, Document No. LTEPTCLOVWWP, Oct. 2008; 21 pages.
Ghaffar, Rizwan, et al., "Fractional Frequency Reuse and Interference Suppression for OFDMA Networks," published in "WiOpt"10: Modeling and Optimization in Mobile, Ad Hoc, and Wireless Networks (2010), Jul. 19, 2010, 5 pages.
Goldsmith, A.J., et al., "Variable Rate Variable—Power MQAM for Fading Channels," IEEE Trans. on Comm. vol. 45, No. 10, Oct. 1997.
"GSMA LTE Roaming Guidelines, Version 9.0," GSM Association, Official Document IR88, Jan. 24, 2013; 53 pages.
Guttman, E., et al., "Service Location Protocol, Version 2," Network Working Group RFC 2608, Jun. 1999, 57 pages.
Haverinen, H., "Extensible Authentication Protocol Method for Global System for Mobile Communications (GSM) Subscriber Identity Modules (EAP-SIM)," Network Working Group RFC 4186, Jan. 2006, 93 pages.
Holappa, Mikko, "Performance Comparison of LTE ENODEB OSI Layer 2 Implementations; Preemptive Partitioned Scheduling vs. Non-Preemptive Global Scheduling," Master's Thesis, Degree Programme in Information Networks; Oulun Yliopisto , University of OULU, Department of Computer Science and Engineering; Oct. 2013, 66 pages.
Holbrook, H., et al., "Source-Specific-Multicast for IP," Network Working Group RFC 4607, Aug. 2006.
Horn, Gavin, "3GPP Femtocells: Architecture and Protocols," Qualcomm Incorporated, 5775 Morehouse Drive, San Diego, CA, Sep. 2010; 64 pages.
"Hysteresis," from Wikipedia, the free encyclopedia; Oct. 1, 2015.

"Hybrid Automatic Repeat Request," from Wikipedia, the free encyclopedia, Jun. 8, 2015; 4 pages.
Ku, Gwanmo, "Resource Allocation in LTE," Adaptive Signal Processing and Information Theory Research Group, Nov. 11, 2011; 33 pages.
Kwan, R., et al., "A Survey of Scheduling and Interference Mitiation in LTE," vol. 2010, Article ID 273486, May 30, 2010.
Kwan, R., et al., "On Radio Admission Control for LTE Systems," Proc. of IEEE VTC-fail, Sep. 6-9, 2010.
La Rocca, Maurizio, "RSRP and RSRQ Measurement in LTE," laroccasolutions Technology & Services, Feb. 2, 2015; 9 pages http://www.laroccasolutions.com/training/78-rsrp-and-rsrq-measurement-in-lte.
Leung, K., et al., "WiMAX Forum/3GPP2 Proxy Mobile IPv4," Independent Submission RFC 5563, Feb. 2010; 41 pages.
Lopez-Perez, D., et al., "Interference Avoidance and Dynamic Frequency Planning for WiMAX Femtocells Networks," Proceedings of ICCS, Jun. 23-25, 2008.
LteWorld, "Packet Data Convergence Protocol (PDCP)," Information Page, LteWorld.org, published on or about Jan. 2, 2013; 2 pages.
"Link Layer Discovery Protocol," Wikipedia, the free encyclopedia, 4 pages, [Retrieved and printed Nov. 17, 2013]; http://en.wikipedia.org/wiki/Link_Layer_Discovery_Protocol.
"LTE Physical Layer Overview," Keysight Technologies, First published on or about Aug. 24, 2014; 11 pages http://rfmw.em.keysight.com/wireless/helpfiles/89600B/webhelp/subsystems/lte/content/lte_overview.htm.
"LTE Frame and Subframe Structure," Cellular/Mobile Telecommunications, Tutorial, Radio-Electronics.com; first published on or about Aug. 6, 2009 http://www. radio-electronics.com/info/cellulartelecomms/lte-long-term-evolution/lte-frame-subframe-structure.php.
"LTE Layers Data Flow," LTE Tutorial, tutorialspoint; first published on or about Jan. 17, 2013; 3 pages; http://www.tutorialspoint.com/lte/lte_layers_data_flow.htm.
"LTE Protocol Stack Layers," LTE Tutorial, tutorialspoint; first published on or about Jan. 16, 2013 http://www.tutorialspoint.com/lte/lte_protocol_stack_layers.htm.
"LTE Quick Reference," from Share Technote; first published on or about Nov. 28, 2012; http://www.sharetechnote.com/html/Handbook_LTE_RNTI.html.
"LTE Quick Reference: CCE Index Calculation," LTE Handbook, Share Technote, first published on or about Jul. 8, 2012 http://www.sharetechnote.com/html/Handbook_LTE_CCE_Index.html.
"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html.
"LTE TDD Overview," from ShareTechnote; first published on or about Jul. 2, 2014 http://www.sharetechnote.com/html/LTE_TDD_Overview.html.
Madan, Ritesh, et al., "Fast Algorithms for Resource Allocation in Wireless Cellular Networks," IEEE/ACM Transactions on Networking, vol. 18, No. 3, Jun. 2010; 12 pages.
Mehlfuhrer, M., et al., "Simulating the Long Term Evolution Physical Layer," Proc. of 17th European Signal Processing Conference (EUSIPCO), Aug. 24-28, 2009.
Narten T., et al., "Neighbor Discovery for IP version 6 (IPv6)," Network Working Group RFC 4861, Sep. 2007; 97 pages.
NGMN Alliance, "Further Study on Critical C-RAN Technologies," Next Generation Mobile Networks, Mar. 31, 2015; 93 pages.
Nivaggioli, Patrice, "Cisco Small Cell Architecture," Cisco Connect, Dubrovnik, Croatia, South East Europe, May 20-22, 2013, © 2012 Cisco and/or its affiliates. All Rights Reserved.; 40 pages.
Novlan, Thomas David, et al., "Analytical Evaluation of Fractional Frequency Reuse for OFDMA Cellular Networks," arXiv: 1101.5130v1 [cs.IT]; arXiv.org, Cornell University Library; Jan. 26, 2011, 25 pages.
Okubo, Naoto, et al., "Overview of LTE Radio Interface and Radio Network Architecture for High Speed, High Capacity and Low Latency," Special Articles on "Xi" (Crossy) LTE Services—Toward

(56) References Cited

OTHER PUBLICATIONS

Smart Innovation—Technology Reports; NTT DOCOMO Technical Journal vol. 13 No. 1, Jun. 2011.
Park, Jeongho, et al., "Interference Level Control in Mobile WiMAX Uplink System," 2009 IEEE Mobile WiMAX Symposium, Jul. 9-10, 2009; 5 pages.
"Paging Channel Selection," UMTS World; first published on or about Jun. 22, 2003; 3 pages; http://www.umtsworld.com/technology/paging.html.
"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.
"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.
"PDCCH Processing," published by Gio Zakradze on Dec. 29, 2014; 56 pages.
"plane (in networking)," Definition from WhatIs.com; Jan. 2013 http://whatis.techtarget.com/definition/plane-in-networking.
Piro, G., et al., "An LTE module for the ns-3 Network Simulator," in Proc. of Wns3 2011 (in conjunction with SimuTOOLS 2011), Mar. 2011, Barcelona Spain.
"QoS Class Identifier," from Wikipedia, the free encyclopedia, Oct. 7, 2015.
"Radius," Wikipedia, the free encyclopedia, 12 pages [Retrieved and printed Oct. 11, 2013] http://en.wikipedia.org/wiki/RADIUS.
"Received signal strength indication," Wikipedia, the free encyclopedia, Dec. 22, 2014; 2 pages.
Rengarajan, Balaji, "A Semi-autonomous Algorithm for Self-organizing Dynamic Fractional Frequency Reuse on the Uplink of OFDMA Systems," Dec. 14, 2009; 22 pages.
"RSRP, EPRE, Total Power," LTE Quick Reference from Sharetechnote.com; first published on or about Aug. 3, 2014; http://www.sharetechnote.com/html/Handbook_LTE_RSRP_EPRE_TotalPower.html.
Ruby, Ruksana, et al., "Uplink Scheduling Solution for Enhancing Throughput and Fairness in Relayed Long-Term Evoluation Networks," IET Communications 2014, vol. 8, Issue 6, Apr. 2014; 13 pages.
Saad, Sawsan A., et al., "A Survey on Power Control Techniques in Femtocell Networks," Journal of Communications vol. 8, No. 12, Dec. 2013; 10 pages.
Sadiq, Bilal, et al., "Throughput Optimality of Delay-driven Max Weight Scheduler for a Wireless System with Flow Dynamics," 47th Annual Allerton Conference, Sep. 30-Oct. 2, 2009, University of Illinois at Urbana-Champaign, Champaign, Illinois; 6 pages.
Seo, H., et al., "A proportional-fair power allocation scheme for fair and efficient multiuser OFDM systems," in Proc. of IEEE GLOBECOM, Dec. 2004, Dallas (USA).
Stefan Schwarz Etal: "Low complexity approximate maximum throughput scheduling for LTE," 2010 44th Asilomar Conference on Signals, Systems and Computers, Nov. 7-10, 2010, XP031860825, DOI:10.1109/ACSSC.2010.5757800ISBN:978-1-4244-9722-5 p. 1563-p. 1565.
Stolyar A.L., et al., "Self-Organizing Dynamic Fractional Frequency Reuse for Best-Effort Traffic through Distributed Inter-Cell Coordination," IEEE INFOCOM 2009, Proceedings of 28th Conference on Computer Communications, Apr. 12, 2009, pp. 1287-1295, XP031468882, ISBN:978-1-4244-3512-8.
Tassiulas, L., et al., "Stability Properties of Constrained Queueing Systems and Scheduling Policies for Maximum Trhoughput in Multihop Radio Networks," Technical Research Report,CSHCN TR 92-3/ISR TR 92-129, Center for Satellite & Hybrid Communication Networks, A NASA Center for the Commercial Development of Space; University of Maryland Institute for Systems Research; Published in IEEE Transactions on Automatic Control, vol. 37, No. 12, Dec. 1992; 14 pages.
Tayal, Nitin, "All About PDCCH and CCE Allocation," Tayal's Way to Learn LTE, Tutorial Blog dated May 2013, 14 pages http://nitintayal-lte-tutorials.blogspot.com/2013/05/all-about-pdcch-and-cce-allocation.html.
Thapa, Chandra, et al., "Comparative Evaluation of Fractional Frequency Reuse (FFR) and Traditional Frequency Reuse in 3GPP-LTE Downlink," International Journal of Mobile Network Communications & Telematics (IJMNCT) vol. 2, No. 4, Aug. 2012; 8 pages.
"Transmission Time Interval," from Wikipedia, the free encyclopedia, May 2, 2013.
UKIPO Mar. 27, 2012 Search Report from GB Patent Application Serial No. GB1120462.5.
UKIPO Jan. 19, 2013 Search Report from GB Patent Application Serial No. GB1120462.5.
UKIPO Dec. 20, 2013 Search Report from GB Application Serial No. GB1312321.1, 6 pages.
Wanda, Alex, "UMTS UTRAN Block Error Rate (BLER) Measurements," Telecom Insights, Jan. 2011; 3 pages http://trends-in-telecoms.blogspot.com/2011/01/umts-utrans-block-error-rate-rate-bler.html.
Wang, Jiao, "Dynamic Centralized Interference Coordination in Femto Cell Network with QoS Provision," Latest Trends on Communications, Proceedings of the 18th International Conference on Communications (Part of CSCC '14), Jul. 17-21, 2014; 6 pages.
Weaver, Carl, "Self-Organizing Mobility Robustness Optimization in LTE Networks with eICIC," Draft V5.0, Submitted Oct. 23, 2013, Cornell University Library, 19 pages http://arxiv.org/abs/1310.6173.
"Whats is Uplink RSSI in LTE," TelecomSource thread, May 22, 2013; 5 pages http://www.telecomsource.net/howthread.php?5464-Whats-is-Uplink-RSSI-in-LTE.
Xiong, Chao, "Enhanced ICIC for LTE-A HetNet," ZTE Corporation, LTE World Summit 2012, May 2012; 3 pages.
Zyren, Jim, "Overview of the 3GPP Long Term Evolution Physical Layer," White Paper, Freescale Semiconductor, Document No. 3GPPEVOLUTIONWP; Jul. 2007; 27 pages.
EPO Aug. 12, 2014 Extended EPO Search Report and Opinion from European Application Serial No. 13195780.8.
EPO Nov. 19, 2015 Extended Search Report and Written Opinion from European Application EP13767700; 9 pages.
EPO Mar. 26, 2015 Extended Search Report and Opinion from European Application Serial No. EP14190541.
PCT Jul. 16, 2013 International Search Report and Written Opinion from International Application PCT/IL2013/050269, 3 pages.
PCT Oct. 1, 2014 International Preliminary Report on Patentability from International Application PCT/IL2013/050269, 4 pages.
PCT Jun. 16, 2014 International Search Report and Written Opinion of the International Searching Authority for International Application Serial No. PCT/IL2013/000085.
PCT—Feb. 13, 2013 International Search Report and Written Opinion from International Application PCT/GB2012/052511; 28 pages.
EPO Jan. 27, 2016 Extended Search Report and Written Opinion from European Application No. 15183582.4.
Sabella, Dario, et al., "RAN as a Service: Challenges of Designing a Flexible RAN Architecture in a Cloud-based Heterogeneous Mobile Network," Future Network Summit Conference, Lisbon, Portugal, Jul. 3-5, 2013; 8 pages.
"ETSI TS-136-423 V9.4.0 (Dec. 2010) Technical Specification: LTE; Evolved Universal Terrestrial Radio Access Network (E-UTRAN); X2 Application Protocol (X2AP) (3GPP TS 36.423 version 9.4.0 Release 9)," ETSI, European Telecommunications Standards Institute, 650 Route des Lucioles F-06921 Sophia Antipolis Cedex—France, Oct. 2010, Section 8.3.8.
"3GPP TS 23.401 V13.3.0 (Jun. 2015) Technical Specification: 3rd Generation Partnership Project; Technical Specification Group Services and System Aspects;General Packet Radio Service (GPRS) enhancements for Evolved Universal Terrestrial Radio Access Network (E-UTRAN) access (Release 13)," 3rd Generation Partnership Project, 650 Route des Lucioles—Sophia Antipolis Valbonne—France, Jun. 2015; Sections 4 and 5 only.

(56) References Cited

OTHER PUBLICATIONS

3GPP Draft R1-124276, Research in Motion UK Limited, "Scoping the UMTS HetNet Study," 3rd Generation Partnership Project (3GPP), Mobile Competence Centre; 650; Route Des Lucioles; F-06921 Sophia-Antipolis; Sep. 2012; XP050662177.
3GPP Draft R3-071432, Telecom Italia, et al., "Self-optimization use case: self-tuning of cell reselction parameters for load balancing," 3rd Generation Partnership Project (3GPP), Mobile Competence Centre; 650; Route Des Lucioles; F-06921 Sophia-Antipolis; Aug. 2007; XP050162260.
"Cisco's One Platform Kit (onePK)," Networking Software (IOS & NX-OS), Cisco Systems, Inc., First published on or about Mar. 3, 2014; 2 pages.
"E Band," from Wikipedia, the free encyclopedia, Dec. 24, 2013; 3 pages.
"EEM Configuration for Cisco Integrated Services Router Platforms," Configuration Guide for Cisco IOS® Embedded Event Manager (EEM), Cisco Systems, Inc., Feb. 2008; 17 pages.
Ericsson, et al., "LPN Range Expansion in Co-Channel Deployment in Heterogeneous Networks," 3GPP Draft R1-125219, , 3rd Generation Partnership Project (3GPP), Mobile Competence Centre; 650; Route Des Lucioles; F-06921 Sophia-Antipolis; Nov. 2012, 7pages.
Ericsson, et al., "On the Feasibility of Operational Carrier Selection," 3GPP Draft R3-112991 , 3rd Generation Partnership Project (3GPP), Mobile Competence Centre; 650; Route Des Lucioles; F-06921 Sophia-Antipolis; Nov. 2011, 7 pages.
"Fading," from Wikipedia, the free encyclopedia, Apr. 10, 2015; 6 pages.
Nokia Corporation, et al., "SON WI Status Overview, 3GPP Draft R2-093231," 3rd Generation Partnership Project (3GPP), Mobile Competence Centre; 650; Route Des Lucioles; F-06921 Sophia-Antipolis; Apr. 2009.
Qualcomm Incorporation: "Design Objectives and Deployment Scenarios for Hetnets," 3GPP Draft R1-124528, 3rd Generation Partnership Project (3GPP), Mobile Competence Centre; 650; Route Des Lucioles; F-06921 Sophia-Antipolis; Sep. 2012, XP050662404.
"Quadrature amplitude modulation," from Wikipedia, the free encyclopedia, Apr. 22, 2015; 11 pages.
Velasco, Julio C., et al., "MEF Microwave Technologies for Carrier Ethernet," Metro Ethernet Forum (MEF), 6033 W. Century Boulevard, Suite 1107, Los Angeles CA 90045 USA Jan. 2011; 23 pages.
EPO Jul. 29, 2014 Extended Search Report from European Application Serial No. EP13195673, 12 pages.
PCT Mar. 17, 2014 International Search Report and Written Opinion from International Application Serial No. PCT/IL2013/000086, 12 pages.
U.S. Appl. No. 14/852,210, filed Sep. 11, 2015, entitled "System and Method for Providing Dynamic Radio Access Network Orchestration," Inventors: Virginia Rosa de Sousa Teixeira, et al.
U.S. Appl. No. 15/008,045, filed Jan. 27, 2016, entitled "System and Method for Providing Dynamic Radio Access Network Orchestration," Inventors: Virginia Rosa de Sousa Teixeira, et al.
U.S. Appl. No. 14/479,343, filed Sep. 7, 2014, entitled "Operation of Base Station in a Celllular Communication Network," Inventor: Simon Burley.
U.S. Appl. No. 15/015,691, filed Feb. 4, 2016, entitled "System and Method for Optimizing Performance of a Communication Network," Inventor(s): Ziv Nuss, et al.
U.S. Appl. No. 14/818,084, filed Aug. 4, 2015 entitled "Resource Adaptation for Frequency Domain Downlink Inter-Cell Interference Coordination," Inventors: Ritesh K. Madan et al.
U.S. Appl. No. 14/848,026, filed Sep. 8, 2015 entitled "Serving Noise/Macro Interference Limited User Equipment for Downlink Inter-Cell Interference Coordination," Inventors: Ritesh K. Madan et al.
U.S. Appl. No. 14/811,580, filed Jul. 28, 2015 entitled "Determining Fractional Frequency Reuse Power Levels for Downlink Transmissions," Inventor: Ritesh K. Madan.
U.S. Appl. No. 14/816,957, filed Aug. 3, 2015 entitled "Selecting Cells for Downlink Inter-Cell Interference Coordination," Inventors: Rohit U. Nabar et al.
U.S. Appl. No. 14/816,990, filed Aug. 3, 2015 entitled "User Equipment Power Level Selection for Downlink Transmissions," Inventors: Vikram Chandrasekhar et al.
U.S. Appl. No. 14/679,868, filed Apr. 6, 2015, entitled "System and Method for Managing Interference in a Network Environment Based on User Presence," Inventors: Mark Grayson, et al.
U.S. Appl. No. 14/687,198, filed Apr. 15, 2015, entitled "System and Method for Managing Interference in a Network Environment Based on User Presence," Inventors: Mark Grayson, et al.
U.S. Appl. No. 14/686,598, filed Apr. 14, 2015, entitled "System and Method for Providing Uplink Inter Cell Interference Coordination in a Network Environment," Inventors: Ritesh K. Madan, et al.
U.S. Appl. No. 14/691,260, filed Apr. 20, 2015, entitled "System and Method for Providing Uplink Inter Cell Interference Coordination in a Network Environment," Inventors: Ritesh K. Madan, et al.
U.S. Appl. No. 14/809,201, filed Jul. 25, 2015, entitled "System and Method to Facilitate Small Cell Uplink Power Control in a Network Environment," Inventors: Ritesh K. Madan, et al.
U.S. Appl. No. 14/833,519, filed Aug. 24, 2015, entitled "System and Method to Facilitate Small Cell Uplink Powercontrol in a Network Environment," Inventors: Ritesh K. Madan, et al.
U.S. Appl. No. 14/918,420, filed Oct. 20, 2015, entitled "System and Method for Frequency and Time Domain Downlink Inter-Cell Interference Coordination," Inventors: Ritesh K. Madan, et al.
U.S. Appl. No. 14/951,987, filed Nov. 25, 2015, entitled "System and Method for Frequency and Time Domain Downlink Inter-Cell Interference Coordination," Inventors: Ritesh K. Madan, et al.
U.S. Appl. No. 14/961,552, filed Dec. 7, 2015, entitled "System and Method to Provide Uplink Interference Coordination in a Network Environment," Inventor: Ritesh K. Madan.
U.S. Appl. No. 14/993,859, filed Jan. 12, 2016, entitled "System and Method to Facilitate Centralized Radio Resource Management in a Split Radio Access Network Environment," Inventor: Ritesh K. Madan.
U.S. Appl. No. 15/002,187, filed Jan. 20, 2016, entitled "System and Method to Provide Small Cell Power Control and Load Balancing for High Mobility User Equipment in a Network Environment," Inventor: Ritesh K. Madan.
U.S. Appl. No. 15/018,677, filed Feb. 8, 2016, entitled "Mitigation of Uplink Interference Within Heterogeneous Wireless Communications Networks," Inventor: Pankaj Uplenchwar, et al.
U.S. Appl. No. 15/071,724, filed Mar. 16, 2016, entitled ""Power Setting,"" Inventor: Pankaj Uplenchwar, et al.
U.S. Appl. No. 15/089,252, filed Apr. 1, 2016, entitled "Method and System for Dynamic Allocation of Resources in a Cellular Network," Inventors: Vladimir Yanover, et al.

* cited by examiner

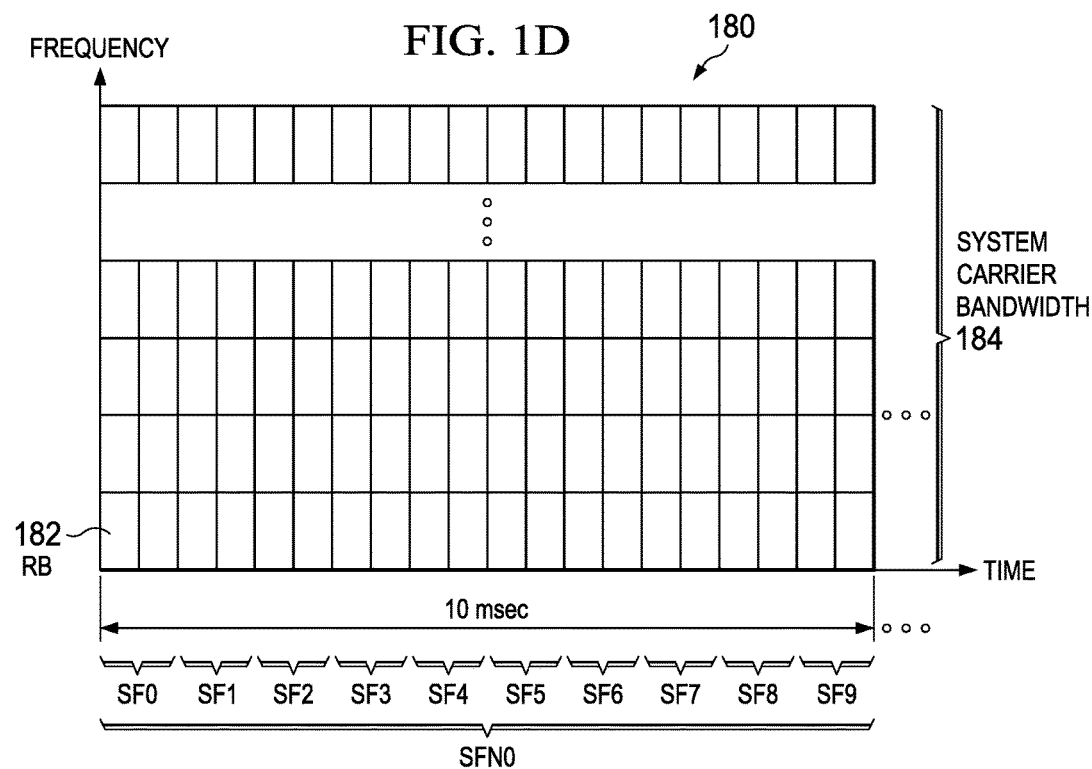
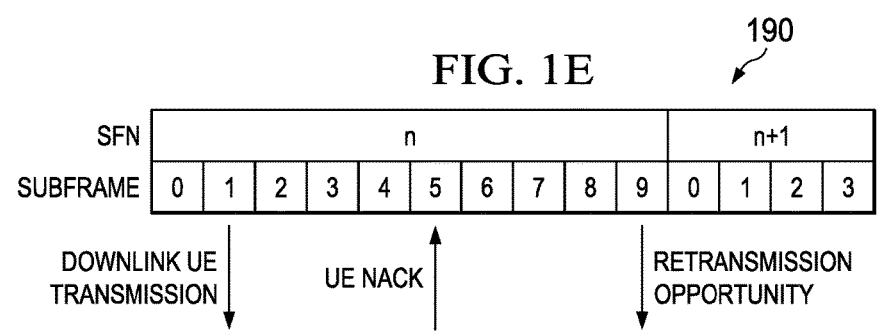

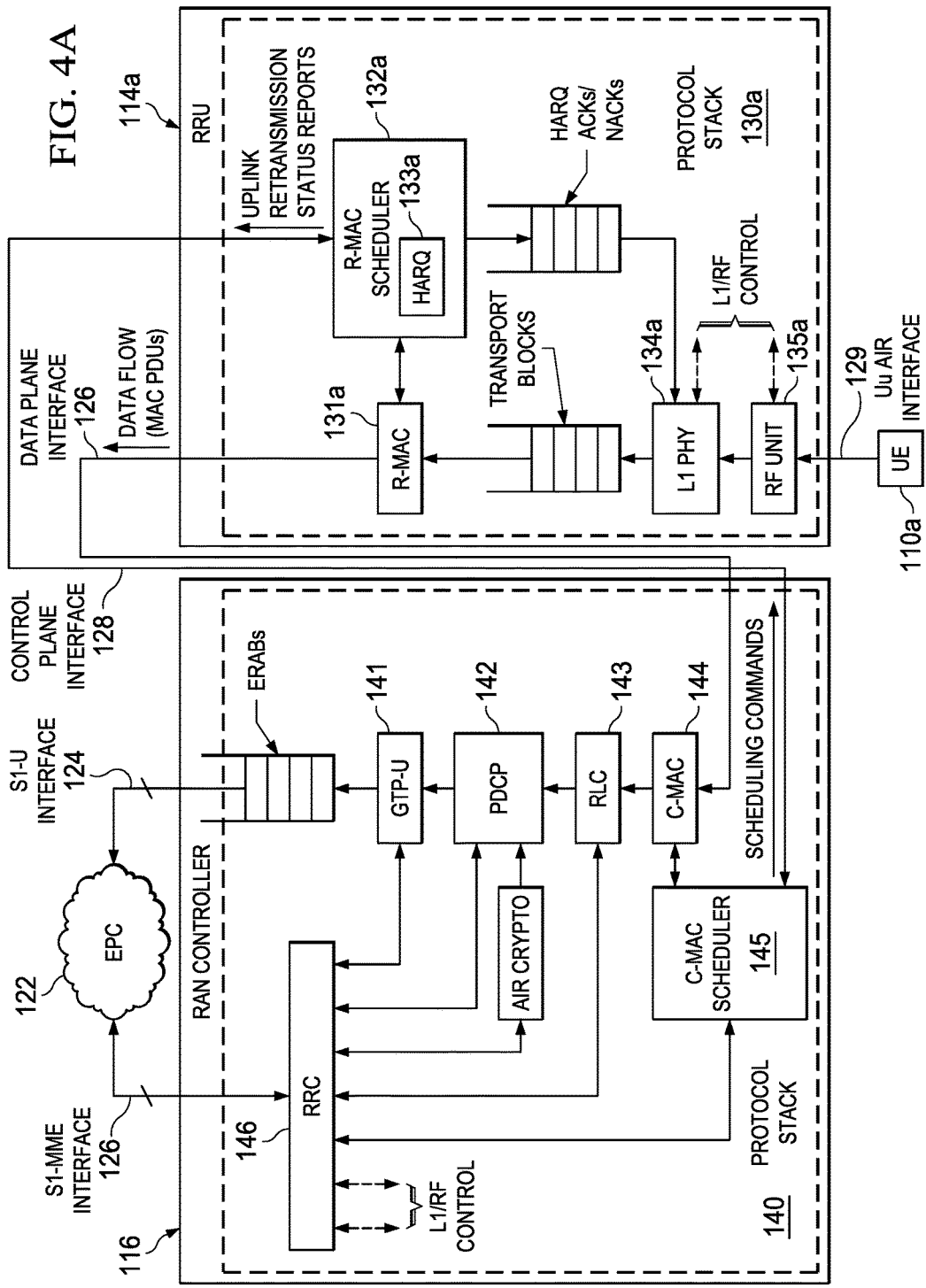

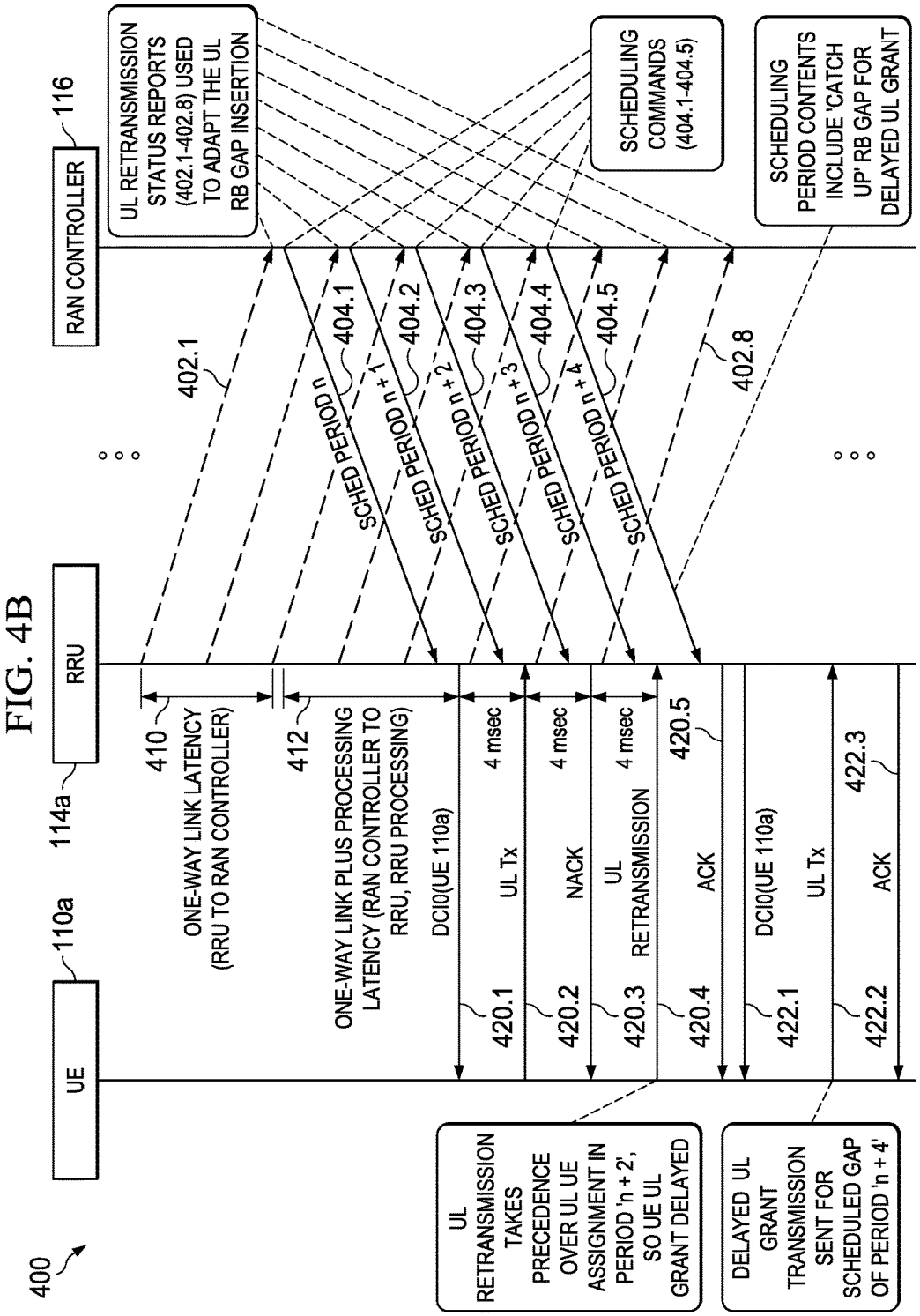

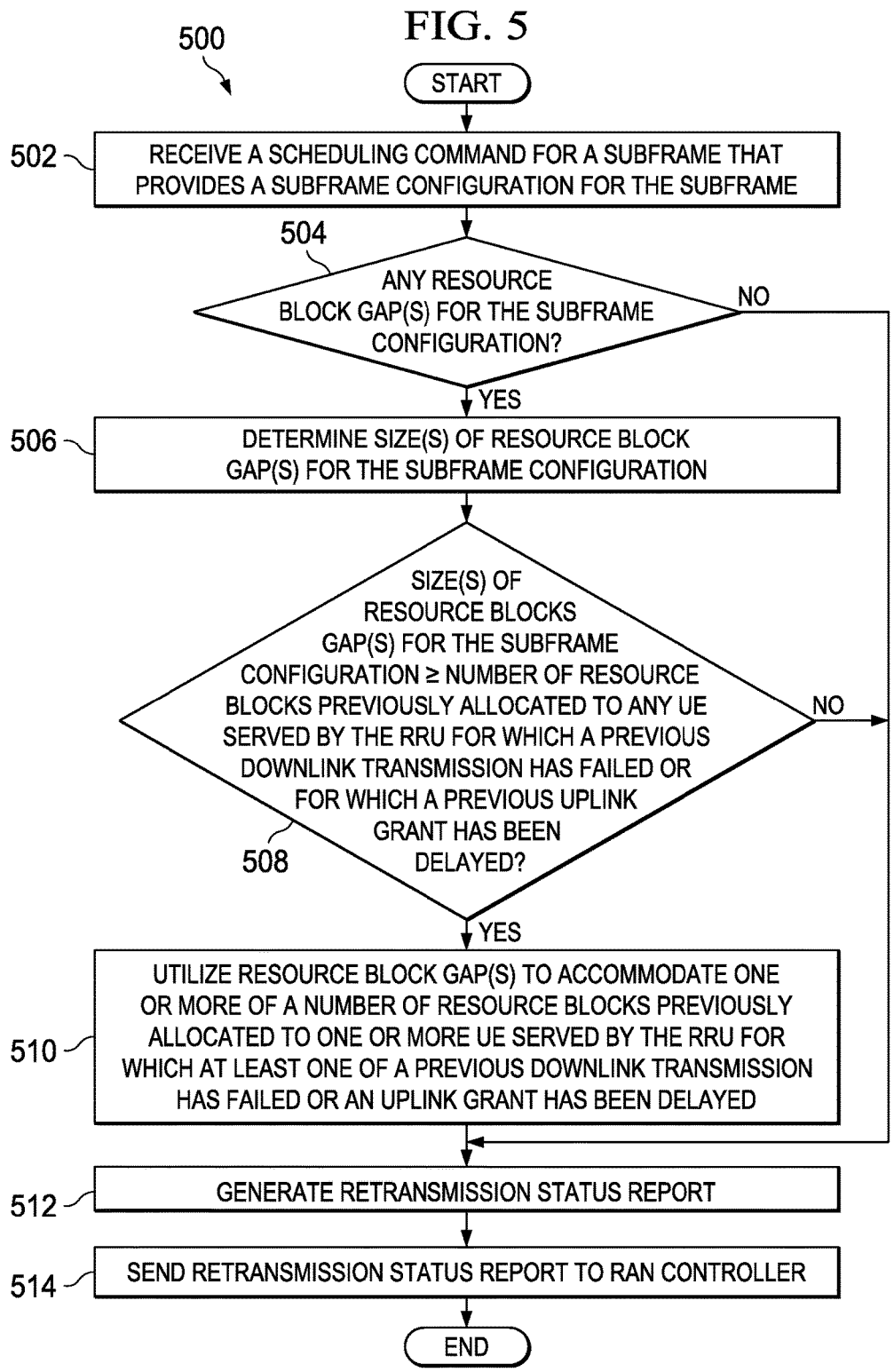

SYSTEM AND METHOD TO FACILITATE SUBFRAME SCHEDULING IN A SPLIT MEDIUM ACCESS CONTROL RADIO ACCESS NETWORK ENVIRONMENT

TECHNICAL FIELD

This disclosure relates in general to the field of communications and, more particularly, to a system and method to facilitate subframe scheduling in a split Medium Access Control (MAC) Radio Access Network (RAN) environment.

BACKGROUND

Networking architectures have grown increasingly complex in communication environments. Mobile communication networks have grown substantially in subscriber base as end users become increasingly connected to mobile wireless environments. As the number of mobile subscribers increases, efficient management of communication network resources becomes more critical. In some instances, network service providers desire to centralize access control, mobility control and/or load control to manage communication network resources. However, there are significant challenges in centralizing control of communication network resources, particularly with regard to timing constraints for subframe scheduling for user equipment within a communication network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 1C-1E are simplified schematic diagrams illustrating example details that can be associated with the communication system in accordance with various potential embodiments;

FIG. 4A is a simplified block diagram illustrating other example details associated with the example protocol stack split of FIG. 1B in accordance with one potential embodiment of the communication system;

FIG. 4B is a simplified interaction diagram illustrating other example signaling interactions that can be associated with subframe scheduling in accordance with one potential embodiment of the communication system; and FIG. 5 is a simplified flow diagram illustrating example operations that can be associated with subframe scheduling in a split MAC RAN environment in accordance with one potential embodiment of the communication system.

DETAILED DESCRIPTION OF EXAMPLE EMBODIMENTS

Overview

Figure 1A:
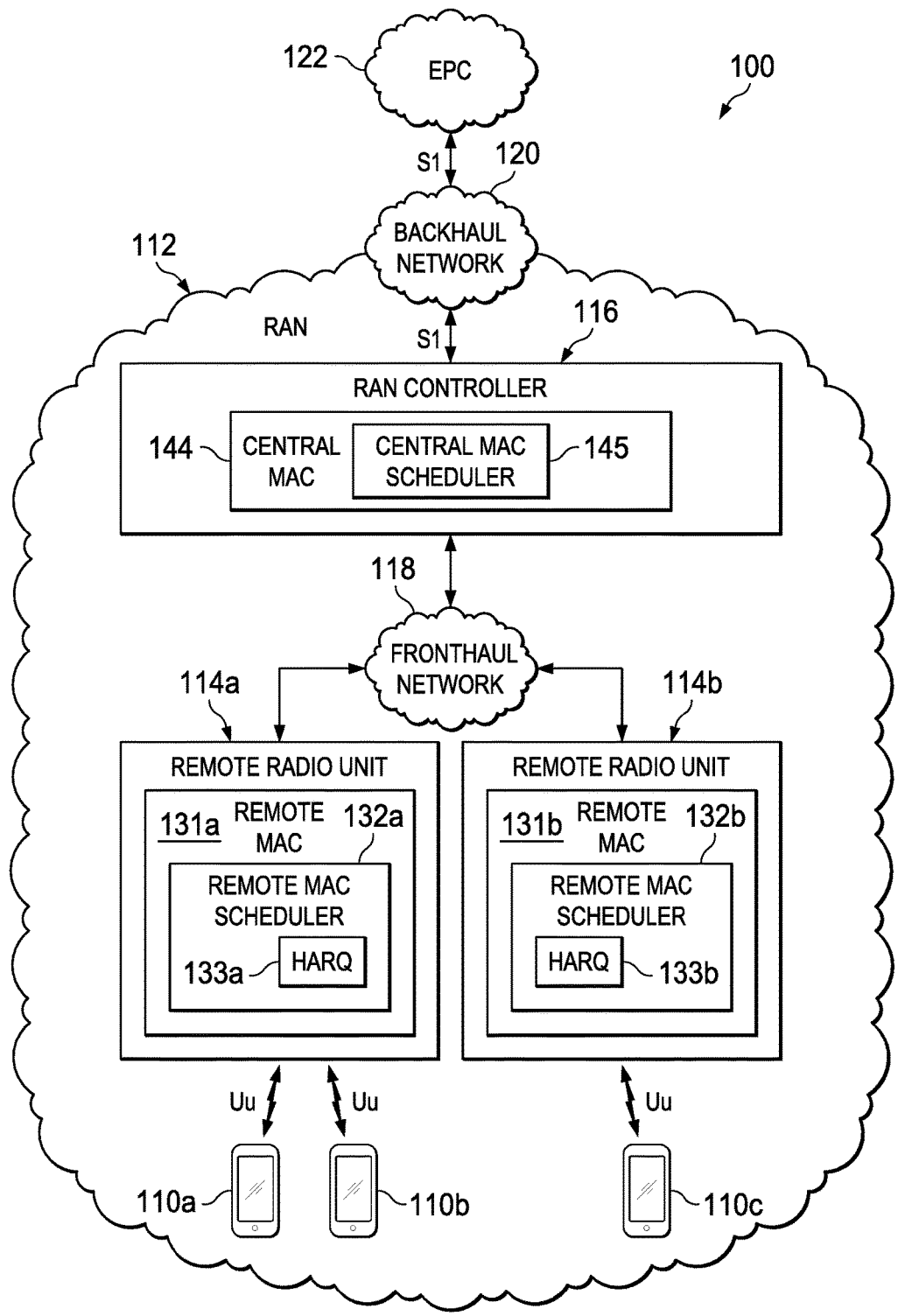
FIG. 1A is a simplified block diagram illustrating a communication system to facilitate subframe scheduling in a split MAC RAN environment according to one embodiment of the present disclosure.

A method is provided in one example embodiment and may include receiving a scheduling command for a subframe at a Remote Radio Unit (RRU), wherein the scheduling command provides a subframe configuration for the subframe; determining whether the subframe configuration comprises at least one resource block gap; and if the subframe configuration comprises a resource block gap, utilizing the at least one resource block gap to accommodate one or more previously allocated resource blocks for one or more user equipment served by the RRU for which at least one of a previous downlink transmission has failed or a previous uplink grant has been delayed. In some instances, the subframe configuration can be associated with downlink transmissions for one or more user equipment served by the RRU. In other instances, the subframe configuration can be associated with uplink transmissions for one or more user equipment served by the RRU.

The scheduling command received at the RRU can include one or more Downlink Control Information (DCI) messages such that each respective DCI message corresponds to a user equipment having one or more resource blocks allocated for the subframe. In some cases, determining whether the subframe configuration comprises at least one resource block gap can be based, at least in part, on the one or more DCI messages included the scheduling command.

The method can include reserving, by a Radio Access Network (RAN) controller, one or more resource block gaps within one or more subframes according to a first resource block gap reservation rate. In some cases, the method can include generating a retransmission status report at the RRU; and sending the retransmission status report to the RAN controller. In still some cases, the method can include updating the first resource block gap reservation rate to a second resource block gap reservation rate based on retransmission feedback information included in the retransmission status report. In some instances, a resource block gap can be restricted to a predetermined number of resource blocks.

Example Embodiments

As referred to herein in this Specification, the terms 'virtual machine', 'virtualized network function' and 'virtualized network functionality' can encompass an emulation of a computer system and/or computing platform operating based on the computer architecture and functions of a real or hypothetical computer, with particular embodiments involving specialized hardware, software, or a combination of both. In various embodiments, a virtualized network function (VNF), a virtual machine (VM), a virtualized network function component (VNFC), virtualized functionality and/or any virtualized network controller, module, aggregator, combinations thereof or the like as described herein may execute via a hypervisor-based virtualization or a container-based virtualization of a server (e.g., blade server, rack server, stand-alone server) using the server's hardware (e.g., processor and memory element) and/or operating system for a given virtualized network environment.

In some cases, VNF(s) can be configured to perform one or more specialized operations within a network environment and one or more instances of the configured VNF(s) can be instantiated in order to execute the one or more specialized operations. In some instances, VNF(s) can include one of more virtualized network function components (VNFCs). A VNFC can be an internal component of a VNF, which can provide a VNF provider a defined subset of that VNF's functionality. In some embodiments, operations associated with a RAN can be configured to be executed via one or more VNFs and/or VNFCs and one or more Physical Network Functions (PNFs) to realize a virtualized RAN (vRAN) architecture. A PNF is typically associated with a hardware radio head, which can be configured with one or more transmitters and receivers (and other associated hardware and software functionality) in order to facilitate over-the-air (OTA) Radio Frequency (RF) communications with one or more user equipment (UE).

Different logical separations of VNFs can be configured for different possible vRAN architectures. For a given vRAN architecture, each configured VNF/VNFC or type of VNF/VNFC can perform certain specialized operations among one or more virtualized network controller(s), module(s), aggregator(s), combinations thereof or any other network element that may be associated with the vRAN architecture. A given vRAN architecture can be realized, in an operational sense, by instantiating VNFs and/or VNFCs associated with the vRAN architecture at runtime, power-up, initialization, dynamically based on load, etc. for one or more servers, etc. in order to execute the specialized operations as configured for the VNFs and/or VNFCs.

Turning to FIG. 1A, FIG. 1A is a simplified block diagram illustrating a communication system 100 to facilitate subframe scheduling in a split MAC RAN environment according to one embodiment of the present disclosure. The particular configuration illustrated in FIG. 1A may be tied to the 3rd Generation Partnership Project (3GPP) Evolved Universal Mobile Telecommunications System (UMTS) Terrestrial Radio Access Network (E-UTRAN) architecture, generally referred to as 4G/LTE, which can interface with a Long Term Evolution (LTE) Evolved Packet System (EPS) core. The EPS core is typically referred to as the Evolved Packet Core (EPC). Alternatively, the depicted architecture may be applicable to other environments equally. In one example, the architecture may be equally applicable to a vRAN architecture in which RAN functionality can be provided via one or more VNFs, one or more VNFCs and/or one or more PNFs.

The term 'fronthaul' is used herein in this Specification to describe interface(s) provided via a fronthaul network that interconnect network elements of any RAN architecture, non-virtualized or virtualized. The term 'backhaul' is used herein in this Specification to describe interface(s) provided via a backhaul network that interconnect network elements of any RAN architecture, non-virtualized or virtualized, to network elements of an EPC. As referred to herein in this Specification, the term 'plane' can refer to a separation of traffic that can traverse a network. Three planes can typically be found in communication networks including: a data plane, a control plane and a management plane. The data plane typically carries user traffic, while the control plane typically carries signaling traffic used to provide routing information for user traffic and the management plane, a subset of the control plane, typically carries administrative traffic. As referred to herein in this Specification, the terms 'user plane', 'data plane' and 'user data plane' can be used interchangeably.

The example architecture of FIG. 1A includes users operating user equipment (UE) 110a-110c, a RAN 112, remote radio units (RRUs) 114a-114b and a RAN controller 116. RAN controller 116 can include a Central Medium Access Control (MAC) protocol layer 144, which can include a Central MAC Scheduler (C-MAC Scheduler) protocol layer 145. RRU 114a can include a Remote MAC (R-MAC) protocol layer 131a, which can include a Remote MAC Scheduler (R-MAC Scheduler) protocol layer 132a. R-MAC Scheduler protocol layer 132a can include a Hybrid Automatic Repeat-Request (HARQ) protocol layer 133a. RRU 114b can include an R-MAC protocol layer 131b, which can include an R-MAC Scheduler protocol layer 132b. R-MAC Scheduler protocol layer 138b can include a HARQ protocol layer 133b.

As referred to herein, a 'C-MAC protocol layer' (e.g., C-MAC protocol layer 144) can be referred to more generally as a 'C-MAC' or a 'C-MAC layer' and a 'C-MAC Scheduler protocol layer' (e.g., C-MAC Scheduler protocol layer 145) can be referred to more generally as a 'C-MAC Scheduler' or a 'C-MAC Scheduler layer'. Similarly, an 'R-MAC protocol layer' can be referred to more generally as an 'R-MAC' or 'R-MAC layer' and an 'R-MAC Scheduler protocol layer' can be referred to more generally as an 'R-MAC Scheduler' or an 'R-MAC Scheduler layer'. Similarly, a 'HARQ protocol layer' can be referred to more generally as a 'HARQ layer' or 'HARQ'. Other protocol layers, as described herein, can be referred to more generally without explicitly including the term 'protocol layer'. A 'protocol layer' or 'layer', as referred to herein, can be any layer in a multi-layered scheme that facilitates communications between layers, such as, for example, the Open Systems Interconnection (OSI) Model, using one or more communication protocols.

As C-MAC 144 and C-MAC Scheduler 145 operate in combination with each other, these layers can be referred to collectively as C-MAC 144/C-MAC Scheduler 145, although specific operations and/or features that might pertain to a particular layer can be referenced with respect to the particular layer as well. Each respective R-MAC and its respective R-MAC Scheduler can also be referred to collectively as a respective R-MAC/R-MAC Scheduler. A respective HARQ and a respective R-MAC Scheduler can be referred to collectively as a respective R-MAC Scheduler/HARQ and a respective R-MAC, a respective R-MAC Scheduler and a respective HARQ can be referred to collectively as a respective R-MAC/R-MAC Scheduler/HARQ.

A fronthaul network 118 may provide infrastructure to provide at least one differentiated, secure, reliable and manageable communication channel, which facilitates interconnections between RRUs 114a-114b and RAN controller 116. A backhaul network 120 may provide infrastructure to provide at least one differentiated, secure, reliable and manageable communication channel, which facilitates interconnections between RAN controller 116 and an EPC 122 via an S1 interface, as defined by 3GPP standards. In at least one embodiment, the S1 interface can include an S1-U interface portion for user data plane traffic exchanged with one or more elements of EPC 122 and can include an S1-MME interface portion for control plane signaling exchanges with one or more elements of EPC 122. In various embodiments, infrastructure can include, but not be limited to: network elements such as routers, switches, gateways, etc.; communication links (wired or wireless); interfaces to facilitate user and control plane exchanges according to one or more signaling protocols; combinations thereof or the like.

In general, RAN 112 may provide a communications interface between UE 110a-110c and EPC 122. In various embodiments, RAN 112 may include access networks such as a Global System for Mobile Communications (GSM)

Enhanced Data Rates for GSM (EDGE) radio access network (GERAN), generally referred to as 2G, a Universal Mobile Telecommunications System (UMTS) Terrestrial radio access network (UTRAN), generally referred to as 3G, and/or a LTE access network such as evolved UTRAN (E-UTRAN), generally referred to as 4G or LTE/LTE-Advanced (LTE-A).

Each of the elements of FIG. 1A may couple to one another through the simple interfaces (as illustrated) or through any other suitable connection (wired or wireless), which provides a viable pathway for network communications. Additionally, any one or more of these elements may be combined or removed from the architecture based on particular configuration needs. In some embodiments, communications in a network environment can be facilitated through the exchange of packets. A packet is a formatted unit of data and can contain both control information (e.g., source and destination address, etc.) and data, which is also known as payload. Network traffic can be sent and received according to any suitable communication messaging protocols. Suitable communication messaging protocols can include a multi-layered scheme such as the OSI Model, or any derivations or variants thereof. For example, communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

Other protocols or interfaces that can be used in communication system 100 can include 3GPP DIAMETER-based protocols, a remote authentication dial in user service (RADIUS) protocol, a service gateway interface (SGi), a terminal access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP), Generic Route Encapsulation (GRE), etc. The terms 'data' and 'information' as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

In various embodiments, EPC 122 can include one or more Mobility Management Entities (MMEs), one or more serving gateways (SGWs), one or more Packet Data Network (PDN) gateways (PGWs), etc., as defined in 3GPP standards for 4G/LTE access networks, to facilitate the exchange of data to and from one or more external PDNs, such as, for example, the Internet, one or more operator IP services (e.g., Voice over LTE (VoLTE)) for UE 110a-110c. EPC 122 may include other elements such as one or more Policy and Charging Rules Functions (PCRFs), one or more Authentication, Authorization and Accounting (AAA) elements, a Home Subscriber Server/Home Location Register (HSS/HLR), etc. to provide connectivity for UE 110a-110c to external PDNs, to implement QoS on packet flows, to provide enhanced services to UE 110a-110c, stateful firewalls, Traffic Performance Optimization, combinations thereof or the like. These network elements are not shown in order to illustrate other features of communication system 100. In some embodiments, EPC 122 can include one or more network elements such as, for example, one or more Mobile Switching Centers (MSCs), one or more Serving General Packet Radio Service (GPRS) Support Nodes (SGSNs), one or more Gateway GPRS support nodes (GGSNs), as defined in 3GPP standards for 2G/3G access networks, to facilitate the exchange of data to and from one or more external PDNs for UE 110a-110c. These network elements are also not shown in order to illustrate other features of communication system 100.

For purposes of the examples and embodiments described herein, it is assumed UE 110a-110c are in communication with (e.g., connected to) a corresponding RRU via an over-the-air (OTA) Uu interface, as defined by 3GPP standards, for one or more voice and/or data sessions such as, for example, an IP connectivity access network (IP-CAN) session, etc. which can support one or more session flows for a given subscriber/UE. For example, UE 110a-110b can be connected to RRU 114a and UE 110c can be connected to RRU 114b. It should be understood, however, that any number of UE can be connected to any RRU 114a-114b within the scope of the teachings of the present disclosure.

As referred to herein in this Specification, the terms 'user', 'subscriber' and 'UE' can be used interchangeably. It should be understood that a user, or more particularly, a subscriber, can be associated with the operation of a corresponding UE for one or more voice and/or data sessions. In various embodiments, a subscriber associated with a given UE can be identified using one or more identifiers such as, for example, an International Mobile Subscriber Identity (IMSI) or a Temporary IMSI (T-IMSI). An IMSI for a given subscriber is typically stored on a Subscriber Identity Module (SIM) (e.g., a SIM card) within the subscriber's UE.

In various embodiments, UE 110a-110c can be associated with any users, subscribers, employees, clients, customers, etc. wishing to initiate a flow in communication system 100 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, i-Pad™, a Google Droid™ phone, an IP phone, or any other device, component, element, or object capable of initiating voice, audio, video, media, or data exchanges within communication system 100. UE 110a-110c may also be inclusive of a suitable interface to a human user such as a microphone, a display, a keyboard, or other terminal equipment.

UE 110a-110c may also be any device that seeks to initiate a communication on behalf of another entity or element such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another. In certain embodiments, UE 110a-110c may have a bundled subscription for network access and application services (e.g., voice), etc. Once the access session is established, the user can register for application services as well, without additional authentication requirements. Within communication system 100, IP addresses (e.g., for UE or any other element in communication system 100) can be assigned using dynamic host configuration protocol (DHCP), Stateless Address Auto-configuration, during default bearer activation processes, etc., or any suitable variation thereof. IP addresses used within communication system 100 can include IP version 4 (IPv4) and/or IP version 6 (IPv6) addresses.

RRUs 114a-114b can offer suitable connectivity to one or more UE (e.g., any of UE 110a-110c) using any appropriate protocol or technique. In various embodiments, one or more RRU 114a-114b can be configured with functionality (e.g., provisioned with transmitters, receivers, hardware, software, etc.) for a macro cell radio to provide coverage for a macro cell network and/or can be configured with functionality for a small cell radio to provide coverage for a small cell network. Small cell radios operate similar to macro cell radios; however, small cell radios typically at a lower transmit power thereby providing coverage to proximate users. In some embodiments, one or more RRU 114a-114b can be configured to provide UTRAN coverage (e.g., for 3G access networks), using functionality as is typically configured for a Node B (NodeB or NB) for a macro cell network and/or a Home Node B (HNB) for a small cell network. In some embodiments, one or more RRU 114a-114b can be configured to provide E-UTRAN coverage (e.g., for 4G/LTE access networks), using functionality as is typically configured for an evolved Node B (eNodeB or eNB) for a macro cell network and/or Home evolved Node B (HeNBs) for a small cell network. In some embodiments, one or more RRU 114a-114b can be configured to provide coverage for one or more wireless networks for technologies such as WiFi, Bluetooth™, WiMAX, etc. In still some embodiments, one or more RRU 114a-114b can be configured to provide coverage for any combination of OTA communication technologies.

RAN controller 116 may represent a central protocol stack processing unit, which may provide centralized control and scheduling decisions to RRU 114a-114b to facilitate the aggregation of traffic (data and control traffic) to and from UE 110a-110c via RRU 114a-114b. In various embodiments, RAN controller 116 can be configured to include control and operation capabilities for one or more lower layers, while also containing data layers for anchoring flows for mobility across the lower layers.

In one embodiment, RAN controller 116 can, during operation, provide subframe scheduling decisions or, more generally, scheduling commands, for uplink and downlink communications between UE 110a-110c and the corresponding RRU to which each UE is connected. Note the terms 'scheduling decisions' and 'scheduling commands' can be referred to interchangeably herein in this Specification.

In one embodiment, the architecture of RAN 112 can represent a cloud RAN (C-RAN) architecture, in which RRUs 114a-114b can be deployed at various geographic locations within communication system 100 to provide access network coverage that facilitates seamless mobility for UE 110a-110c as the UE move within the communication system. RRUs 114a-114b can be interconnected via fronthaul network 118 to RAN controller 116, which can be configured in a data center (e.g., including one or more servers) or a cloud server center (e.g., including one or more servers interconnected across multiple data centers) that can be approximately located at a different or a same geographic location as any of RRUs 114a-114b. In various embodiments, RAN controller 116 can be a specialized unit or part of a virtualized compute platform that can operate in a data center or cloud server center or any other network element that may be associated with RAN 112. Thus, operational functionality for RAN controller 116 may be virtualized into a vRAN architecture to facilitate dynamic control and scheduling operations for communication system 100.

In at least one embodiment, RAN controller 116 and RRUs 114a-114b can facilitate a split MAC RAN environment for RAN 112 in which Layer 1 (L1) (Physical (PHY) layer) and certain lower level Layer 2 (L2) functionality, such as R-MACs 131a-131b, can be provided via RRUs 114a-114b, respectively, to facilitate OTA communications with UE 110a-110c and certain upper level L2 (e.g., C-MAC 144) functionality, Radio Resource Control (RRC) functionality, S1 and/or X2 interface signaling and/or other protocol functionality can be provided via RAN controller 116 for interfacing between RRUs 114a-114b and EPC 122.

Figure 1B:
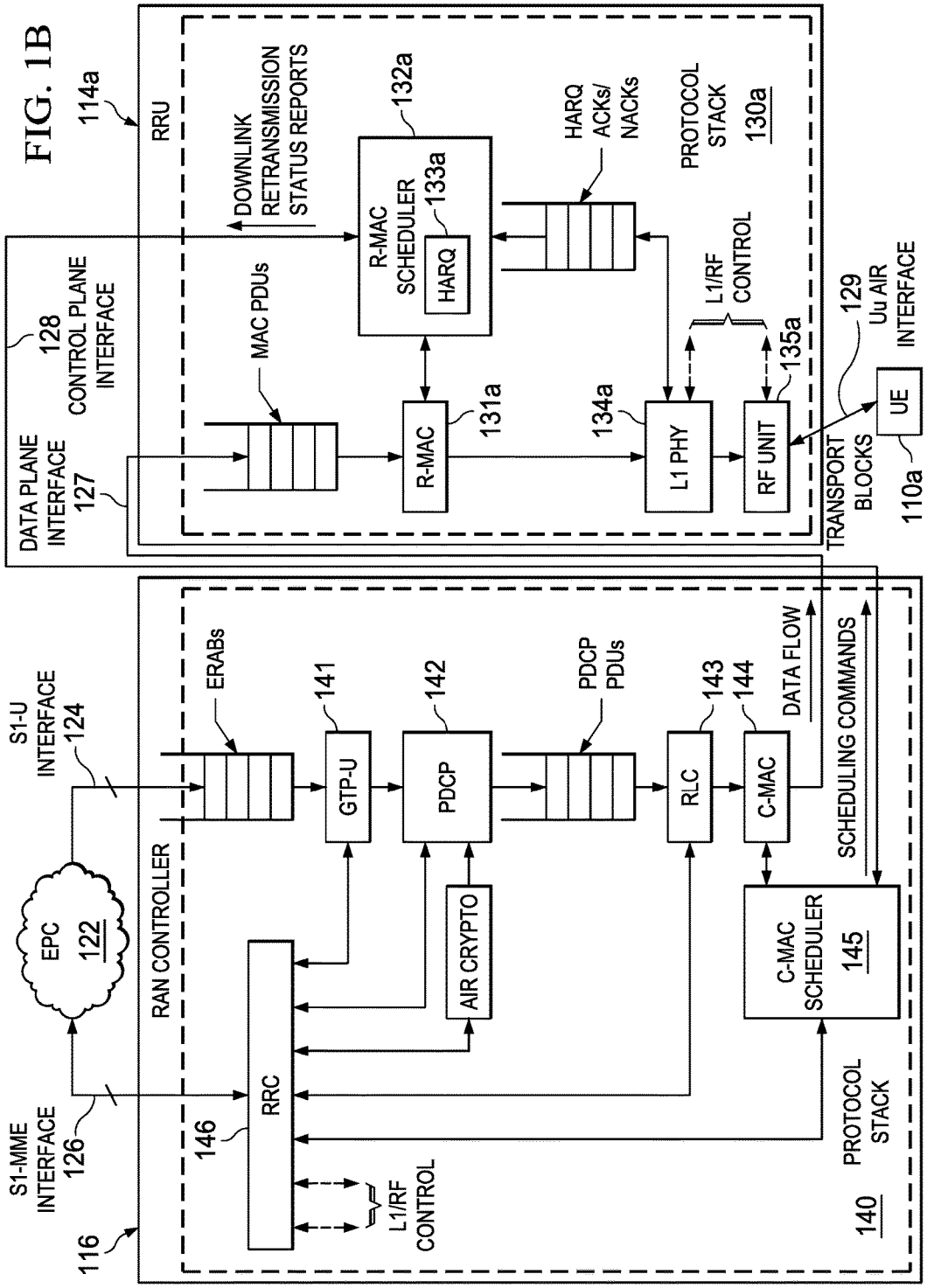
FIG. 1B is a simplified block diagram illustrating example details that can be associated an example protocol stack split for transmissions within a split MAC RAN environment in accordance with one potential embodiment of the communication system.

FIG. 1B is described in combination with reference to FIG. 1A. Referring to FIG. 1B, FIG. 1B is a simplified block diagram illustrating example details associated with an example protocol stack split that can be configured for RAN controller 116 and a particular RRU (e.g., RRU 114a) to facilitate user data plane and control plane communications associated within the split MAC RAN environment of communication system 100 in accordance with one potential embodiment. In particular, FIG. 1B illustrates example details associated with downlink transmissions the can be facilitated by the system and method provided by communication system 100. Although FIG. 1B illustrates RRU 114a, it should be understood that RRU 114b can be configured in a similar manner to provide similar operations as RRU 114a.

RAN controller 116 can include a protocol stack 140. For data plane traffic, protocol stack 140 can include a user data plane GTP (GTP-U) protocol layer 141, a Packet Data Convergence Protocol (PDCP) protocol layer 142, a Radio Link Control (RLC) protocol layer 143 and C-MAC 144. For control plane traffic, protocol stack 140 can include C-MAC Scheduler 145 and an RRC protocol layer 146.

RRU 114a can include a protocol stack 130a. For data plane traffic, protocol stack 130a can include R-MAC layer 131a, a L1 PHY layer 134a and an RF unit 135a. For control plane traffic, protocol stack 130a can include R-MAC Scheduler 132a and HARQ 133a.

A user data plane S1-U interface 124 provided via backhaul network 120 can facilitate the exchange of downlink data, such as packetized E-UTRAN Radio Access Bearers (ERABs) for a given UE (e.g., UE 110a, 110b), between one or more elements of EPC 122 and RAN controller 116 via GTP-U layer 141. A control plane S1-MME interface 126 provided via backhaul network 120 can facilitate the exchange of Non-Access Stratum (NAS) control signaling between one or more elements of EPC 122 and RAN controller 116 via RRC layer 146.

A user data plane C-MAC interface, denoted herein as a data plane interface 127, provided via fronthaul network 118 can facilitate the exchange of downlink data, such as MAC Protocol Data Units (PDUs) between C-MAC layer 144 and R-MAC layer 131a. A control plane C-MAC Scheduler interface, denoted herein as a control plane interface 128, provided via fronthaul network 118 can facilitate the exchange of control signaling between C-MAC Scheduler 145 and R-MAC Scheduler 132a as well as any protocol layer control signaling exchanged via RRC layer 146 and one or more protocol layers of protocol stack 130a. A Uu air interface 129 can be facilitated via RF unit 135a and one or more RF units configured for each UE. The Uu air interface 129 can enable data and control exchanges between RRU 114a and a given UE (e.g., UE 110a, 110b). UE 110a is shown in FIG. 1B. In various embodiments, an RF unit (e.g., RF unit 135a) can include one or more transmitter(s) and one or more receiver(s) in connection with one or more antenna(s) for a given node (e.g., RRU 114*a*) to facilitate over-the-air communications.

During operation in a downlink data scenario, downlink data such as packetized ERABs destined to a given UE (e.g., UE 110*a*) can be received by RAN controller 116 via GTP-U layer 141. The ERABs can be routed to PDCP layer 142, which can operate on the ERABs as PDCP Service Data Units (SDUs) and can generate PDCP PDUs to output to RLC layer 143. In one embodiment, PDCP layer 142 can apply an air crypto (e.g., encryption) and/or other addressing/control information to the packets based on control signaling received from RRC layer 146. RLC layer 143 can operate on PDCP PDUs as RLC SDUs and can generate RLC PDUs to output to C-MAC layer 144. In one embodiment, RLC layer 143 can concatenate and segment higher layer PDCP PDUs into pre-derived packetized data blocks that can be passed to C-MAC layer 144 based on control signaling received from RRC layer 146. C-MAC 144 and C-MAC Scheduler 145 can operate on the RLC PDUs as MAC SDUs and can generate MAC PDUs to send to R-MAC layer 131*a* containing data and/or control information or, more generally, resources allocated to UE 110*a* across time and frequency domains. The data and control (data/control) information are to be transmitted via OTA transmissions to UE 110*a* according to a DL transmission schedule determined by C-MAC Scheduler 145.

One or more MAC PDU can be sent to R-MAC layer 131*a* for each subframe in which UE 110*a* is scheduled to receive resources. Data/control information within each MAC PDU scheduled at the C-MAC 144/C-MAC Scheduler 145 can be allocated to a number of physical Resource Blocks (RBs). The RBs can be constructed at the L1 PHY layer 134*a* using the data/control information included in each MAC PDU and transmitted to UE 110*a* using a number of transport blocks for each subframe. In various embodiments, the size of MAC PDUs sent from C-MAC layer 144 to R-MAC layer 131*a* can vary depending on a number of RBs allocated to a given UE for a given transmission and an instantaneous Modulation and Coding Scheme (MCS) that the UE can support for the given transmission. As provided by 3GPP standards (e.g., TS 36.211), modulation types for UE transmissions can include Quadrature Phase Shift Keying (QPSK) and Quadrature Amplitude Modulation (QAM) including 16QAM, 64QAM and 256QAM with modulation order increasing from QPSK to 256QAM. Air interface coding or precoding can be defined based on, among other things, the number of antenna ports used for certain transmissions. In a Multiple Input Multiple Output (MIMO) configuration, for example, a UE can receive multiple transport blocks in a single radio transmission from its serving RRU. Thus, the number of MAC PDUs can be equal to the number of transmissions blocks, which equals the MIMO transmission mode. In some embodiments, as discussed in further detail herein, unallocated RBs can be provided for subframes in which the unallocated RBs can be used to facilitate re-transmissions for UE for which a previous downlink transmission may have failed.

Scheduling commands can be sent from C-MAC Scheduler 145 to R-MAC scheduler 132*a* via the control plane interface 128. In one embodiment for a Frequency Division Duplexing (FDD) deployment, a scheduling command for a particular subframe can include a number of Downlink Control Information (DCI) messages associated with downlink and uplink data transmissions for a particular subframe. DCI messages can indicate a configuration for a particular subframe, referred to interchangeably herein as a 'subframe configuration'. Thus, a subframe configuration for a particular subframe can be determined by decoding DCI messages(s) included in a scheduling command for the particular subframe. In various embodiments, a subframe configuration for a particular subframe indicates which RBs across time (e.g., slot) and frequency are allocated to which UE for downlink and/or uplink transmissions to be performed during the particular subframe.

DCI messages are transmitted in a control region of a subframe, which is referred to as the Physical Downlink Control Channel (PDCCH). Downlink UE data transmitted within a subframe are transmitted via transport blocks using the Physical Downlink Shared Channel (PDSCH). In general, DCI messages can include critical information associated with one or more of: DL scheduling assignments associated with DL resource allocations; uplink (UL) grants associated with UL resource allocations; power control information; system configuration information, random access; paging; etc. as can be defined in 3GPP standards, for each UE served by a given RRU.

DCI messages can be constructed according to various DCI formats based on the type of control information to be included in the DCI message, as described in 3GPP Technical Specification (TS) 36.212. DCI message formats can include but not be limited to: Format 0 [Physical Uplink Shared Channel (PUSCH) scheduling in one UL cell]; Format 1 [PDSCH codeword scheduling in one cell]; Format 1A [PDSCH codeword scheduling with random access procedure initiated by a PDCCH order]; Format 1B [compact PDSCH codeword scheduling with precoding information]; Format 1D [PDSCH codeword scheduling with precoding and power information]; Format 2 [DCI includes: carrier indicator, resource allocation header, resource block assignment, etc.]; Format 2A [similar to format 2 with different bit allocations for precoding information, etc.]; and Format 2B [similar to format 2 with addition of new data indicator for single-antenna port transmission] as prescribed in TS 36.212. As referred to herein in this Specification, a 'DCI message' can be referred to interchangeably as a 'DCI'.

When discussing a number of DCIs herein in this Specification, it should be understood that the number of DCIs included in a scheduling command can correspond in a 1:1 ratio to the number of UE(s) having resources (uplink and/or downlink) allocated for a particular subframe.

Before discussing additional operational aspects of R-MAC layer 131*a*, R-MAC Scheduler layer 132*a* and HARQ 133*a*, it is important to appreciate certain foundational information related to over-the-air communications that can be exchanged between RRUs and UEs. The following foundational information may be viewed as a basis from which the present disclosure can be properly explained. The following foundational information is offered earnestly for teaching purposes only and, therefore, should not be construed in any way to limit the broad teachings of the present disclosure.

As generally provided in 3GPP architectures, data and control information is communicated between RRUs and UEs using Resource Blocks (RBs). RBs can be used for both downlink communications (e.g., transmissions from a given RRU to a given UE served by the RRU) and uplink communications (e.g., transmissions from a given UE to a given RRU serving the UE).

Figure 1C:
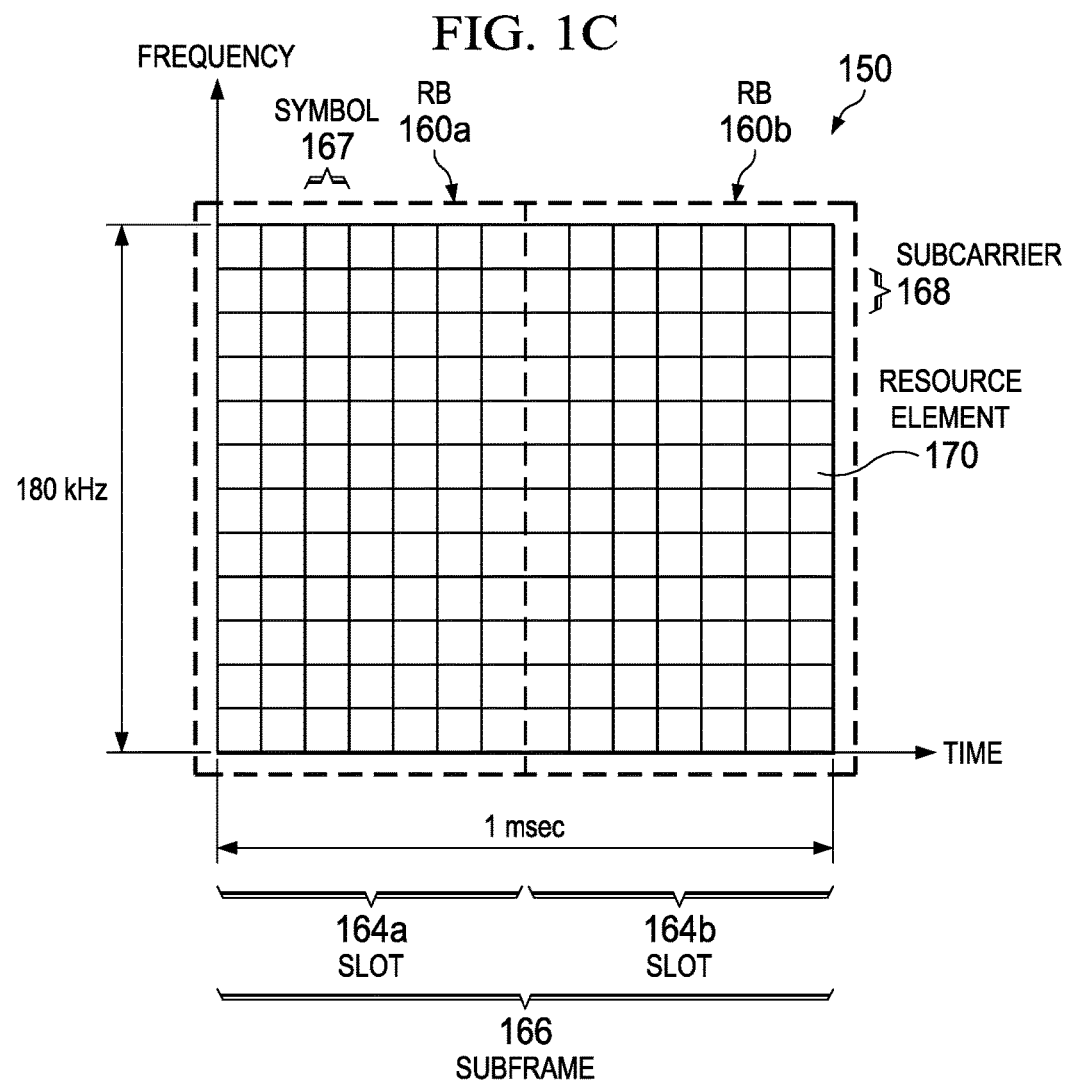

Referring to FIG. 1C, FIG. 1C is a simplified schematic diagram illustrating an example time-frequency grid 150 for a first example downlink RB 160*a* and a second example downlink RB 160*b* that can be used for transmitting data and/or control information using Frequency Division Duplexing (FDD) in accordance with one potential embodiment. Each downlink RB 160a, 160b can include a number of resource elements 170 spread across a number of symbols 167 in the time domain and across a number of subcarriers 168 in the frequency domain. Each resource element 170 can represent one symbol 167 by one subcarrier 168. In the frequency domain, the number of subcarriers 168 for each downlink RB 160a, 160b is typically twelve (12) at a subcarrier bandwidth of 15 kilohertz (kHz) for LTE communications. Thus, each downlink RB typically spans 180 kHz of system carrier bandwidth. In the time domain, each downlink RB 160a, 160b can include a number of symbols 167 spanning a respective 0.5 millisecond (msec) slot 164a, 164b of a 1 msec subframe (SF) 166. In various embodiments, the number of symbols 167 per downlink RB 160a, 160b can depend on the cyclic prefix (CP) type for transmissions (e.g., seven (7) symbols for normal cyclic prefix or six (6) symbols for symbols for extended cyclic prefix). Thus, for normal CP, the number of resource elements 170 per downlink RB 160a, 160b can be equal to 84 resource elements (e.g., 12 subcarriers×7 symbols=84 resource elements).

The PDCCH of a subframe in which control information for UE served by a given RRU can be carried can occupy first 1-4 symbols of the first slot of the subframe depending on channel bandwidth, the number of UE to receive resources, the number of resources each UE is to receive, synchronization channel information (e.g., Cell-Specific Reference signals), etc. Because the number of symbols occupied by the PDCCH can vary, the capacity of downlink RBs for carrying data can vary. In LTE architectures, control channel information (e.g., a DCI) for a given UE is encoded for a subframe according to a Radio Network Temporary Identifier (RNTI) for the UE. Based on its RNTI, a UE can decode a DCI on the PDCCH that was meant for the UE. The DCI can allow the UE to determine the location of RBs meant for the UE being transmitted on the PDSCH.

Uplink RBs for subframes carried on the PUSCH can have a similar structure as downlink RBs. However, the capacity of uplink RBs for carrying data on the PUSCH typically does not vary.

Referring to FIG. 1D, FIG. 1D is a simplified schematic diagram illustrating an example time-frequency grid 180 for a number of resource blocks 182 that can be used for communications in accordance with one potential embodiment. In the frequency domain, resource blocks 182 can be spread across a given system carrier bandwidth 184. In the time domain, resource blocks 182 can span a number of subframes (e.g., SF0-SF9) for a number of system frames (e.g., System Frame Number 0 (SFN0)) in which each system frame can span 10 msec. It should be understood that the number of subframes and system frames can extend across time during operation.

As system bandwidth can vary for LTE architectures, such as, for example, between 1.4 megahertz (MHz) and 20 MHz, the number of available RBs that can be scheduled or allocated across UEs served by a given RRU can vary, respectively, between 1 and 100 RBs per 1 msec Transmission Time Interval (TTI) (e.g., 1 msec subframe) for a given transport block of RBs. Typically, a 10 MHz system carrier bandwidth corresponds to 50 available RBs that can be allocated across UEs served by a particular RRU for a particular TTI of a particular transport block. Typically, each UE served by a given RRU can be allocated a number of the RBs in the time-frequency grid. Generally, the more RBs that a UE is allocated and the higher the modulation order that is used in transmitting the RBs will result in a higher achievable bit-rate or throughput rate for the UE. Which RBs and how many each UE is allocated at a given point in time depends upon frequency and time scheduling mechanisms for the cellular network. Through one or more DCI(s) that may be included in a scheduling command, a subframe configuration can be determined for a corresponding subframe, which can indicate which RBs are allocated to which UE(s) for the subframe for uplink and/or downlink transmissions and whether there are any unallocated RBs for the subframe. As referred to herein in this Specification, RBs can be generally referred to as 'resources'.

Referring again to FIGS. 1A and 1B, when the protocol stack is split at the MAC scheduler between the RAN controller 116 and each RRU 114a-114b, fronthaul delays over the fronthaul network 118 can result in scheduling decisions about UEs (e.g., UE 110a-110c) that will have radio resource allocations on particular subframes needing to be made in advance of the subframe for which transmissions are to occur. For a given 1 msec subframe, the UE resource allocation combinations that can be accommodated for the subframe are defined according to the RNTI for each UE. The RNTI of a UE is used to hash the location of control channel information (e.g., the DCI) for a UE on the PDCCH. Therefore, if a transmission for a subframe scheduled by RAN controller 116, via C-MAC Scheduler 145 were to be delayed at a given RRU, there would no guarantee that it would be possible to transmit the same combination of resources and control channel information on another subframe. Additionally, some subframes can have resource blocks that have lower capacity as there can be other physical channels that use some of the resource blocks' symbols (e.g., varying number of symbols occupied by the PDCCH, as discussed above). Therefore, it would be beneficial if transmissions scheduled by RAN controller 116 via C-MAC Scheduler 145 occur on the specified subframe.

A Channel Quality Indicator (CQI) reported by a UE gives a value corresponding to the highest coding rate that can be used by its serving radio, which would result in less than a 10% probability of error that transmission of a transport block would fail for the UE as specified in 3GPP TS 36.214 § 7.2.3. LTE architectures typically employ a HARQ process to detect and correct errors that may occur on the Uu interface. HARQ responses are typically sent from a node that is to receive a transmission back to the node from which the transmission was sent. A HARQ response can either be a Positive-Acknowledgment (ACK) or a Negative-Acknowledgment (NACK). For example, if a transmission is not decoded correctly by a receiving node (e.g., UE 110a), a Negative-Acknowledgement (NACK) can be sent from the node that at detected the error back to the node responsible for the transmission to stimulate a retransmission from the transmitting node. HARQ procedures are performed close to the radio interface (e.g., L1) to minimize the response latency and/or retransmission time, in the case of a decode failure. Thus, the HARQ procedure can be viewed as an N-process stop-and-wait reliable transmission method with ACK/NACK feedback.

For Frequency Division Duplexing (FDD) operation, this is specified in 3GPP standards as 8 HARQ processes with a 4 msec feedback cycle. In the downlink, HARQ ACKs/NACKs are asynchronous so a HARQ Process ID (PID) is carried in the PDCCH to identify each downlink transmission. This means that a downlink retransmission doesn't have to occur 8 msec after an initial transmission but can be delayed. For example, in LTE, a downlink retransmission can occur a minimum of 4 msec after a HARQ NACK but can be delayed longer as identified by its PID. As shown in FIG. 1B, HARQ ACKs/NACKs can be received by RRU 114a via RF unit 135a and L1 PHY layer 134a.

Referring to FIG. 1E, FIG. 1E is a simplified schematic diagram 190 illustrating example details that could be associated with an example LTE FDD HARQ cycle of 4 msec from a downlink transmission to a HARQ response and a further 4 msec to a first downlink retransmission opportunity. As shown in FIG. 1E, a downlink UE transmission of one or more transport blocks is performed at SFN n, subframe 1. A UE HARQ NACK is received at SFN n, subframe 5 for the one or more transport blocks indicating that the UE was unable to decode the resources transmitted to the UE. A downlink retransmission opportunity for the NACKed MAC PDU is present at SFN n, subframe 9.

In a split MAC RAN/split protocol stack environment, HARQ responses can either be handled locally at the RRU or can be handled remotely by the RAN controller for scheduling retransmissions. However, current solutions for handling HARQ responses either locally or remotely can cause conflicts at the RRU due end-to-end round trip delays between the RAN controller and the RRU. The conflicts can arise at the RRU in deciding between performing a retransmission and performing a new transmission scheduled by the RAN controller. In current split protocol architectures, two possible solutions exist, however, neither is desirable or efficient.

For a first potential solution, the RRU could pre-empt new transmissions scheduled by the RAN controller and can send a retransmission instead. The delayed new transmission scheduled by the RAN controller could be reported back to the RAN controller by the RRU to be rescheduled by the RAN controller. However, this would result in a delay of more than twice the fronthaul link latency. Alternatively, the delayed transmission could be queued locally for a transmission opportunity. However, this alternative solution is further complicated by the need to avoid control channel resource conflicts that could prevent it from being transmitted by the RRU.

For a second potential solution, a HARQ Negative-Acknowledged (NACKed) transmission could be reported by the RRU to the RAN controller and the RAN controller could reschedule the transmission and resend it to the RRU. However, the this potential solution will result in a long retransmission delay that significantly increases the packet delay to a UE and can result in significant radio resource inefficiencies if all HARQ processes are exhausted; thereby preventing further transmissions to that UE. Neither the first nor the second potential solutions are desirable or efficient.

Similar issues can be present for UL retransmissions from UE; however, there is less flexibility in how the RRU can behave as the HARQ processing for UL retransmissions is synchronous. This means that an UL retransmission must occur 4 msec after a HARQ NACK is sent from the RRU, as defined in 3GPP standards. Thus, UL retransmissions are to be handled pre-emptively at the RRU as the round trip delay in communicating with the RAN controller limits the possibility of scheduling uplink retransmissions centrally. As uplink retransmissions must be handled locally at the RRU, previously scheduled UL grants must be delayed. In one potential solution, a report could be sent to the RAN controller indicating that a grant has been delayed and the RAN controller could either reschedule the grant or could recalculate scheduling allocations based on the UE transmission failing. Again, however, a potential solution is neither desirable nor efficient for handling UL retransmissions.

In accordance with one embodiment, communication system 100 can overcome the aforementioned shortcomings by providing a system and method to facilitate subframe scheduling in a split MAC RAN environment through deterministic air interface scheduling by the RAN controller 116 via C-MAC 144/C-MAC Scheduler 145. In one embodiment, C-MAC 144/C-MAC Scheduler can adaptively reserve a certain number of empty RB allocations for certain subframes handled by a given R-MAC of a given RRU. In one sense, empty RB allocations or, more generally, unallocated RBs for a particular subframe, can represent an 'RB gap' corresponding to a certain number of RBs that have not been allocated to transmissions (downlink and/or uplink) for the particular subframe. By reserving an RB gap of a certain number of unallocated RBs for a subframe, the unallocated RBs of the RB gap for that subframe can be used for downlink retransmissions or delayed uplink transmissions.

In one embodiment, the method provided by communication system 100 can utilize quantized RB allocation sizes at the C-MAC 144/C-MAC Scheduler 145 for downlink and uplink transmissions on the air interface. Using quantized RB allocation sizes can enable RB gaps of one or more quantized RB allocation sizes to be adaptively reserved for certain subframes according to an RB gap reservation rate. The size of an RB gap can correspond to the number of RBs that can be allocated to the gap.

In at least one embodiment, the quantization of RB allocation sizes can depend on system bandwidth and the number of UEs served by a given RRU. For example, using a 10 MHz system bandwidth (e.g., 50 available RBs for resource allocation) and considering two (2) UEs per TTI for a given RRU, the resources could be split into RB allocation sizes of 24 RBs and 26 RBs (denoted as '24/26') per UE; considering three (3) UEs per TTI, RB allocation sizes of 12/12/26 or 24/12/14 could be utilized; considering four (4) UEs per TTI RB allocation sizes of 12/12/12/14 or 24/16/6/14 could be utilized; or any other RB allocation sizes could be provided depending on the number of UEs served by a particular RRU for a particular subframe. As referred to herein, a set of restricted RB allocation sizes can be referred to as 'restricted set' of RB allocation sizes and can be denoted using the label 'X-RB' where X is the number of RBs for a given RB allocation size (e.g., 6-RB, 12-RB, etc.).

In one embodiment, different sets of RB allocation sizes could be configured for communication system 100 such that when the number of UEs that an RRU serves changes, the set of RB allocation sizes used for scheduling subframes for that RRU can be updated based on the number of UEs served by the RRU. Thus, in various embodiments, set(s) of RB allocation sizes can be adaptively updated on a subframe and/or system frame basis as the number of UEs that a RRU serves may change through time.

The use of quantized RB allocation sizes is needed to allow straightforward substitution at a given RRU for downlink retransmissions and/or delayed uplink transmissions that may be needed at the RRU. In a typical LTE cell, the number of RBs allocated to UEs is determined on a subframe by subframe basis depending, at least in part, on the number of UEs and their instantaneous throughput. However, using the typical scheme for RB allocations in a split MAC RAN environment, such as those shown in FIGS. 1A-1B, could result in different numbers of RBs being allocated to UEs on each subframe, which could make it difficult to reserve appropriate RB gap sizes for subframe configurations that could be utilized by a given RRU for downlink retransmissions and/or delayed uplink transmissions.

For example, by allowing RB gaps of all sizes to be utilized by C-MAC 144/C-MAC Scheduler 145, then a given RRU (e.g., a given R-MAC/R-MAC scheduler) would have to wait for an RB gap of an appropriate size to be provided for a subframe in order to utilize the RB gap for a given downlink retransmission and/or delayed uplink transmission of the corresponding size. The wait time for appropriate gap sizes could lead to UEs being starved for resources. However, using a restricted set(s) of RB allocation sizes, as described for various embodiments as discussed herein, can allow the C-MAC 144/C-MAC Scheduler 145 to reserve RB gaps that can be used by any 'in-flight' transmissions of the corresponding sizes that may fail.

C-MAC scheduler 145 can reserve a number of RB gap(s) of different RB allocation sizes for certain subframes. It should be understood that the overall size of all RB gap(s) reserved for a subframe will be equal to the total number of unallocated RBs for the subframe as summed across each of the number of RB gap(s) that may be provided for different RB allocation sizes reserved for the subframe. A given R-MAC Scheduler can utilize the RB gap(s) to accommodate one or more downlink retransmissions as may be needed based on one or more retransmission MAC PDUs that may be queued at the RRU or to accommodate uplink transmissions for one or more delayed uplink grants as may be needed based on one or more delayed uplink grants that may be queued at the RRU.

In the downlink, air interface scheduling can be provided by the RAN controller 116 via C-MAC 144/C-MAC Scheduler 145 by adaptively reserving one or more RB gap(s) for one or more RB allocation size(s) for subframe configurations according to a particular downlink gap reservation rate. The one or more RB gap(s) can allow the RRU (e.g., the R-MAC/R-Scheduler of the RRU) to perform downlink retransmissions as needed based on HARQ responses from any UE served by the RRU. For downlink retransmissions, the R-MAC/R-MAC Scheduler of a given RRU can utilize RB gap(s) to accommodate retransmission MAC PDU(s) of appropriate size(s) for certain subframe(s) in which the gap(s) of appropriate size(s) are present. Based on scheduling commands received from C-MAC Scheduler 145, the R-MAC/R-MAC scheduler can determine when RB gap(s) of an appropriate size may be present for a subframe configuration of a particular subframe by decoding DCI(s) included in the scheduling command for the subframe in order to accommodate retransmission MAC PDU(s) within the particular subframe.

RB gap(s) reserved by the C-MAC Scheduler 145 for a particular subframe configuration can be utilized in any manner by a given RRU/R-MAC Scheduler to accommodate HARQ based transmissions as may be needed at the RRU, which may or may not correspond to the number of RB gap(s) for certain RB allocation sizes reserved by the C-MAC Scheduler 145 for the particular subframe.

In one embodiment, one or more lower order RB allocation size(s) can be deliberately configured so that they may sum to one or more higher order RB allocation size(s). This can allow the number of UEs to be varied while providing for flexible retransmissions and/or delayed transmissions at a given RRU. Consider a downlink example for a 10 MHz system bandwidth in which RB allocation sizes are restricted to 3/3/6/12/26 for up to 5 UEs that can be served by a given RRU (e.g., RRU 114a). For a particular subframe, assume C-MAC Scheduler 145 determines a subframe configuration for the particular subframe corresponding to an RB allocation for two UEs of 12 RBs and 26 RBs and reserves two 3-RB gaps and one 6-RB gap for the subframe configuration.

C-MAC Scheduler 145 can send a scheduling command to R-MAC Scheduler 132a including two DCI messages. R-MAC Scheduler 132a can decode the DCI messages to determine that the overall size of the RB gaps reserved by the subframe configuration results in an RB gap size of 12 unallocated RBs being reserved for the particular subframe. Based on retransmission MAC PDUs that may be queued at RRU 114a and the restricted set of RB allocation sizes, R-MAC Scheduler 132a can use the RB gaps to accommodate any of: one retransmission MAC PDU for the particular subframe that corresponds to a 12-RB allocation for a UE that may be queued at RRU 114a; two MAC PDUs that each correspond to 3-RB allocations for each of two UEs and one retransmission MAC PDU that corresponds to a 6-RB allocation for a UE for the particular subframe; two retransmission MAC PDUs that each correspond to 6-RB allocations for each of two UEs for the particular subframe; or any combination thereof as may be needed at RRU 114a. Thus, RB gap(s) of appropriate size(s) can be utilized by a given RRU/R-MAC Scheduler to accommodate any downlink MAC PDU retransmissions that may be needed at the RRU.

Turning to the uplink, air interface scheduling can be provided by the RAN controller 116 via C-MAC 144/C-MAC Scheduler 145 by adaptively reserving a number of RB gap(s) for subframe configurations according to a particular uplink RB gap reservation rate. The RB gaps can be utilized for delayed uplink transmissions that have been preempted by uplink retransmissions for any UE served by the RRU. Recall that uplink retransmissions are synchronous and must occur 4 msec after a HARQ NACK is sent in response to an uplink transmission that was incorrectly decoded by the RRU. Thus, when an uplink retransmission is scheduled for a given subframe, some of the allocation of RBs for the subframe configuration, as allocated by the RAN controller 116, will be replaced by uplink retransmission RBs. Any uplink grant(s) for RB allocations for UE served by the RRU that match the size of the uplink retransmission RBs can be queued until RB gap(s) of the appropriate size(s) are available to accommodate uplink transmissions from UE(s) that have had their original uplink transmissions preempted by uplink retransmissions from other UE served by the RRU.

Accordingly, using restricted set(s) of RB allocation size(s) will provide opportunities for a given RRU to perform downlink retransmissions as needed for previously NACKed downlink transmissions and will enable the RRU to handle delayed uplink transmissions as needed that may have been preempted by NACKed uplink transmissions. The handling of retransmissions and/or delayed transmissions can be performed in tandem with all normal transmissions scheduled by the C-MAC 144/C-MAC Scheduler 145; thereby maintaining control channel integrity and RB allocations determined by the C-MAC 144/C-MAC Scheduler 145.

It should be understood that the RB allocation sizes discussed for various examples and embodiments described herein are only a few examples of the many possibilities of RB allocation sizes that could be provided in accordance with various embodiments of communication system 100. Any other set(s) of RB allocation sizes could be provided within the scope of the teachings of the present disclosure. In one embodiment, an algorithm could be provided to maximize RB allocation sizes for a split MAC RAN environment that considers one or more factors including, but not limited to: system bandwidth, number of RRUs, number of UE served by a particular RRU, channel conditions, interference, Signal-to-Interference Noise Ratio (SINR), MCS, combinations thereof or the like.

In various embodiments, it will be important to optimize the frequency and number of RB gaps reserved for subframes scheduled by the C-MAC 144/C-MAC Scheduler 145. For example, if there are an insufficient number of RB gaps reserved within subframes, delays for downlink retransmissions or uplink transmissions can become significant, which can lead to UEs being starved for resources. Alternatively, if there are too many RB gaps reserved within subframes, then bandwidth can be wasted when there are no downlink retransmissions and/or uplink transmissions to fill them.

In order to remedy this potential problem, communication system 100 can provide a feedback mechanism to adapt the number of RB gap(s) reserved for subframe(s), the size of RB gap(s) reserved for subframe(s) and/or the RB gap reservation rate provided by the C-MAC 144/C-MAC Scheduler 145 for subframe configurations. In one embodiment, the RB gap reservation rate (e.g., reservation frequency) for each subframe configuration provided to a given RRU can be set according to a nominal retransmission rate of 10% and then can be increased or decreased based on downlink and uplink retransmission status reports received from the RRU. In one embodiment, a downlink RB gap reservation rate can be used for reserving RB gap(s) for subframe configurations at a certain rate and an uplink RB gap reservation rate can be used for reserving RB gap(s) for subframe configurations at a certain rate. In various embodiments, the downlink RB gap reservation rate and the uplink RB gap reservation rate for subframe configurations provided to a given RRU can be the same or different.

During operation, downlink retransmission status reports associated with queued downlink retransmission MAC PDUs and uplink retransmission status reports associated with queued uplink transmission grants can be sent from each respective R-MAC Scheduler 132*a*, 132*b* to C-MAC Scheduler 145. Retransmission status report messaging can be facilitated between each R-MAC Scheduler 132*a*, 132*b* and C-MAC Scheduler 145 via the control plane interface 128 provided via fronthaul network 118.

Retransmission status reports can include various retransmission feedback information associated with downlink or uplink retransmissions at a particular RRU. In one embodiment, downlink retransmission status reports can include retransmission feedback information such as an indication of a number of outstanding retransmissions for each of one or more RB allocation size(s) configured for the communication system that need to be transmitted by a given RRU. In one embodiment, if the number of outstanding downlink retransmissions increases for one or more RB allocation size(s), then the C-MAC 144/C-MAC Scheduler 145 can increase the number of RB gap(s), the size of RB gap(s) and/or the downlink RB gap reservation rate for subframe configurations scheduled for the given RRU. Conversely, if the number of outstanding downlink retransmissions decreases for one or more RB allocation size(s), then the C-MAC 144/C-MAC Scheduler 145 can decrease the number of RB gap(s), the size of RB gap(s) and/or the downlink RB gap reservation rate for subframe configurations scheduled for the given RRU.

In one case, if the number of downlink retransmissions needed for a large RB allocation size, say, for example, a 24-RB allocation size, increases beyond a certain retransmission threshold, then the number and/or downlink RB gap reservation rate for 24-RB allocation size RB gap(s) can be increased. In another case, for example if the number of downlink retransmissions needed for a small RB allocation size, say, for example, a 4-RB allocation size, increases beyond a certain retransmission threshold, then the number of RB gap(s) and/or the downlink RB gap reservation rate for the 4-RB allocation size RB gap(s) can be increased or the number of RB gap(s) and/or the rate reservation of a higher order RB allocation size (e.g., 8-RB, 12-RB, etc.) can be increased.

In one embodiment, uplink retransmission status reports can include an indication of a number of uplink transmission grants queued for each of one or more RB allocation size(s) configured for the communication system that need to be transmitted by a given RRU. If the number of queued uplink transmission grants increases for one or more RB allocation size(s), then the C-MAC 144/C-MAC Scheduler 145 can increase the number of RB gap(s), the size of RB gap(s) and/or the uplink RB gap reservation rate for subframe configurations scheduled for the given RRU. If the number of queued transmission grants decreases for one or more RB allocation size(s), then the C-MAC 144/C-MAC Scheduler 145 can decrease the number of RB gap(s), the size of RB gap(s) and/or the uplink RB gap reservation rate for subframe configurations scheduled for the given RRU.

In other embodiments, retransmission status reports (downlink and/or uplink) can include retransmission feedback information that can describe the prevailing conditions at each RRU 114*a*, RRU 114*b*, which can include, but not be limited to: a higher/lower (H/L) indication for number, size and/or RB gap reservation rate for one or more RB allocation size(s); a windowed Block Error Ratio (BLER) percentage (e.g., windowed in time); and/or a per UE BLER percentage, any of which can be used by the C-MAC 144/C-MAC Scheduler 145 to increase or decrease any of the number, the size and/or the RB gap reservation rate of one or more RB allocation size(s) for subframe configurations scheduled for each RRU 114*a*, RRU 114*b*.

Figure 2A:
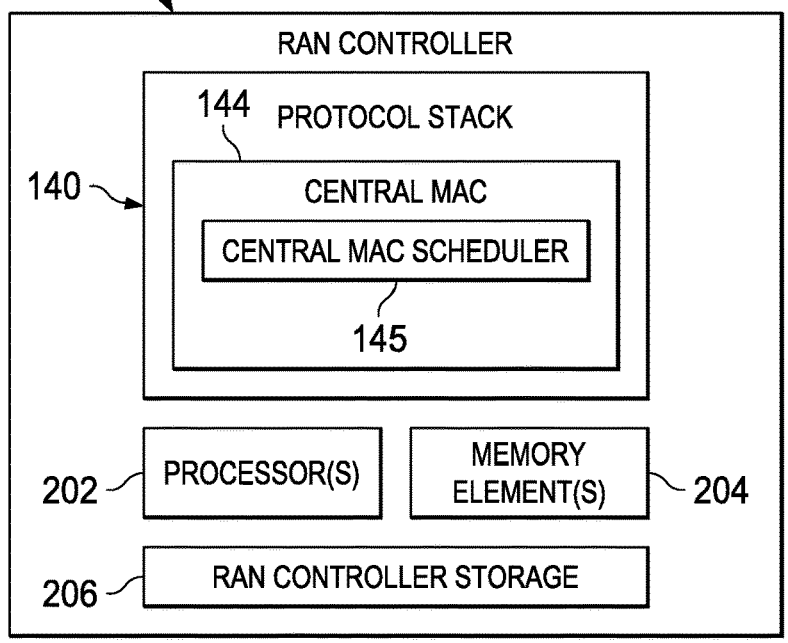
FIGS. 2A-2B are simplified block diagrams illustrating other example details that can be associated with the communication system in accordance with various potential embodiments.
Figure 2B:
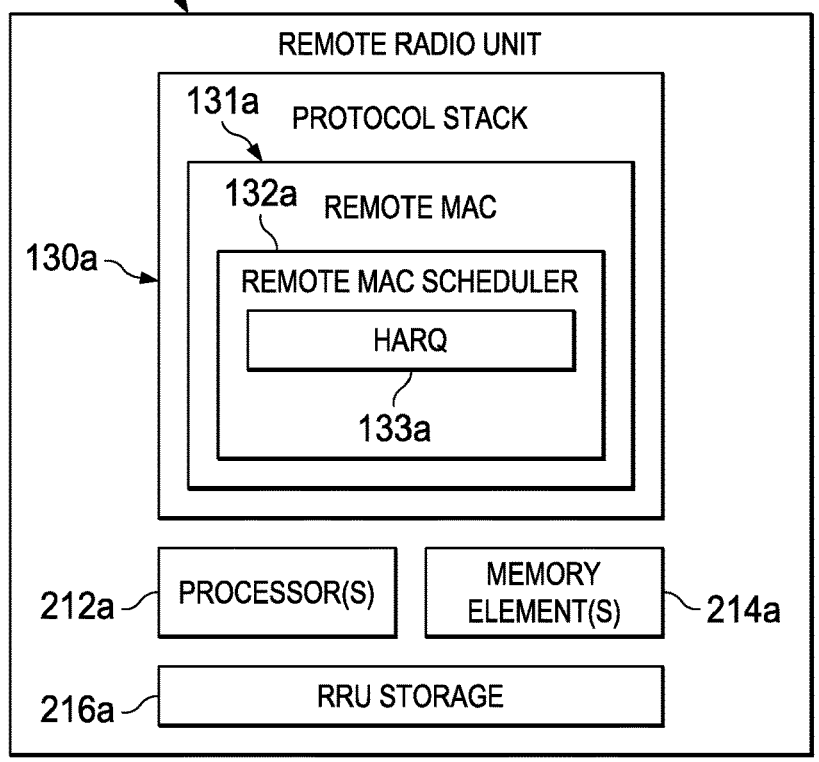

Turning to FIGS. 2A-2B, FIGS. 2A-2B are simplified block diagrams illustrating other example details of various elements that can be associated with communication system 100 in accordance with one or more potential embodiments. FIG. 2A is a simplified block diagram illustrating other example details that can be associated with RAN controller 116 in accordance with one potential embodiment of communication system 100. FIG. 2B is a simplified block diagram illustrating other example details that can be associated with RRU 114*a* in accordance with one potential embodiment of communication system 100. Although FIG. 2B describes example details related to RRU 114*a*, it should be understood that the example details as described for RRU 114*a* can also be provided with respect to RRU 114*b*.

Referring to FIG. 2A, RAN controller 116 can include protocol stack 140, at least one processor(s) 202, at least one memory element(s) 204 and a RAN controller storage 206. Protocol stack 140 can include Central MAC (C-MAC) 144 and C-MAC Scheduler 145. Other layers can be provided for protocol stack 140 (e.g., as shown in FIG. 1B), however, these layers are not shown in FIG. 2A for purposes of discussing other features of RAN controller 116.

In at least one embodiment, at least one processor(s) 202 is at least one hardware processor(s) configured to execute various tasks, operations and/or functions associated with RAN controller 116 as described herein and at least one memory element(s) 204 is configured to store data associated with RAN controller 116. In at least one embodiment, C-MAC 144 and C-MAC Scheduler 145 are configured to implement various subframe scheduling operations as described herein including, but not limited to: processing downlink and uplink retransmission status reports; providing RB gaps (e.g., unallocated RBs) for one or more corresponding RB allocation size(s) to accommodate one or more downlink retransmissions and/or delayed uplink transmissions for each RRU 114*a*, 114*b*; generating scheduling commands including scheduling control information (e.g., DCIs) to send to each R-MAC Scheduler 132*a*, 132*b*; combinations thereof or the like. In various embodiments, RAN controller storage 206 can be configured to store information associated with various scheduling operations as described herein including, but not limited to, RB allocation size information, retransmission feedback information received in downlink and uplink retransmission status reports, RB gap reservation rates, DCI format information, RNTI information for UE served by RRUs 114*a*-114*b*, configuration information, combinations thereof or the like.

Referring to FIG. 2B, RRU 114*a* can include protocol stack 130*a*, at least one processor(s) 212*a*, at least one memory element(s) 214*a* and an RRU storage 216*a*. In at least one embodiment, at least one processor(s) 212*a* is a hardware processor(s) configured to execute various tasks, operations and/or functions of RRU 114*a* as described herein and at least one memory element(s) 214*a* is configured to store data associated with RRU 114*a*. Protocol stack 130*a* can include Remote MAC (R-MAC) 131*a*, R-MAC Scheduler 132*a* and HARQ 133*a*. Other layers can be provided for protocol stack 130*a* (e.g., as shown in FIG. 1B), however, these layers are not shown in FIG. 2B for purposes of discussing other features of RRU 114*a*.

In at least one embodiment, R-MAC 131*a*, R-MAC Scheduler 132*a* and HARQ 133*a* are configured to implement various subframe scheduling operations as described herein including, but not limited to: receiving scheduling commands from C-MAC Scheduler 145, HARQ processing; decoding DCIs included in scheduling commands for corresponding MAC PDUs to determine whether any RB gap(s) are present for certain subframe(s) to accommodate any downlink retransmissions and/or delayed uplink transmissions that may be needed; providing retransmission status reports (downlink and uplink) to C-MAC Scheduler 145; calculating BLER percentages; calculating retransmission rates or other feedback information; combinations thereof or the like. In various embodiments, RRU storage 216*a* can be configured to store information associated with various subframe scheduling operations as described herein including, but not limited to, queued scheduling commands received from C-MAC Scheduler 145, queued MAC PDUs received from C-MAC 144, queued RBs received from UE 110*a*-110*b*, queued uplink grants that may have been preempted by uplink retransmissions, queued retransmission MAC PDUs for one or more downlink retransmissions, DCI format information, downlink and uplink retransmission status report information, queued HARQ ACKs/NACKs, RB allocation size information, configuration information, combinations thereof or the like.

In regards to the internal structure associated with communication system 100, each of UE 110*a*-110*c* and RRU 114*b* may each also include a respective processor, a respective memory element a respective storage and a respective protocol stack. Hence, appropriate software, hardware and/ or algorithms are being provisioned in UE 110*a*-110*c*, RRU 114*a*-114*b*, and RAN controller 116 in order to facilitate subframe scheduling operations in a split MAC RAN environment as described for various embodiments discussed herein. Note that in certain examples, certain databases (e.g., for storing information associated with subframe scheduling for communication system 100) can be consolidated with memory elements (or vice versa), or the storage can overlap/ exist in any other suitable manner.

In one example implementation, UE 110*a*-110*c*, RRU 114*a*-114*b*, and RAN controller 116 are network elements, which are meant to encompass network appliances, servers, routers, switches, gateways, bridges, loadbalancers, firewalls, processors, modules, or any other suitable device, component, element, or object operable to exchange information that facilitates or otherwise helps facilitate subframe scheduling for RRUs (e.g., for networks such as those illustrated in FIGS. 1A-1B). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these elements may include any suitable algorithms, hardware, software, components, modules, interfaces, or objects that facilitate the operations thereof. This may be inclusive of appropriate algorithms and communication protocols that allow for the effective exchange of data or information.

In various embodiments, UE 110*a*-110*c*, RRU 114*a*-114*b*, and RAN controller 116 may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. Information being tracked or sent to UE 110*a*-110*c*, RRU 114*a*-114*b*, and RAN controller 116 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and/or user equipment can also include suitable interfaces, protocol stacks, for receiving, transmitting, and/ or otherwise communicating data or information in a network environment.

Note that in certain example implementations, the subframe scheduling operations as outlined herein may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIGS. 2A-2B] can store data used for the operations described herein. This includes the memory elements being able to store software, logic, code, or processor instructions that are executed to carry out the activities described herein. A processor (e.g., a hardware processor) can execute any type of instructions associated with the data to achieve the operations detailed herein. In one example, the processors [as shown in FIGS. 2A-2B] could transform an element or an article (e.g., data, information) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable PROM (EEPROM) or an ASIC that includes digital logic, software, code, electronic instructions, or any suitable combination thereof.

Figure 3:
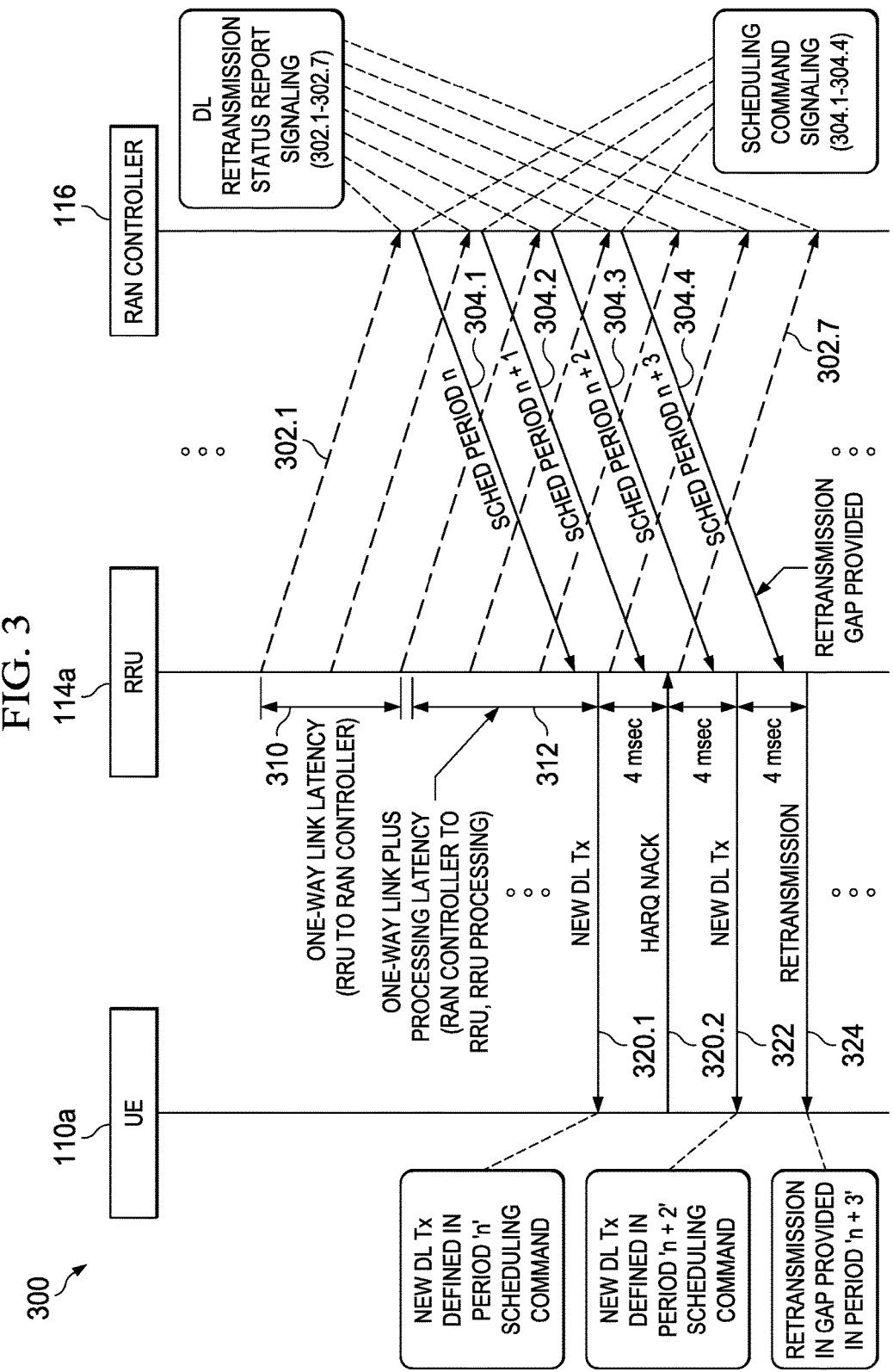
FIG. 3 is a simplified interaction diagram illustrating example signaling interactions that can be associated with subframe scheduling in accordance with one potential embodiment of the communication system.

Turning to FIG. 3, FIG. 3 is a simplified schematic diagram 300 illustrating example signaling interactions that can be associated with subframe scheduling in accordance with one potential embodiment of communication system 100. FIG. 3 includes UE 110a, RRU 114a and RAN controller 116. It should be understood that signaling interactions between RAN controller 116 and RRU 114a can be facilitated as described herein via C-MAC 144/C-MAC Scheduler 145 and R-MAC 131a/R-MAC Scheduler 132a. Although FIG. 3 is described with reference to RRU 114a and UE 110a, it should be understood that similar signaling interactions can occur between RRU 114b and RAN controller 116 for UE 110c or for any other RRU and UE served thereby, which may be deployed in communication system 100.

The example signaling interactions illustrated in the embodiment of FIG. 3 can represent a 'snapshot' in time of example signaling that can be performed between RAN controller 116, RRU 114a and UE 110a. FIG. 3 illustrates downlink (DL) retransmission status report signaling 302.1-302.7 for communicating DL retransmission status reports from RRU 114a to RAN controller 116. As described for various embodiments herein, DL retransmission status reports can be used by C-MAC 144/C-MAC Scheduler 145 to adapt RB gap reservations for subframe configurations scheduled for RRU 114a. One-way link latency 310 can represent the signaling latency that may be present over the fronthaul network 118 for signaling from RRU 114a to RAN controller 116.

Scheduling command signaling 304.1-304.4 is illustrated for a number of scheduling commands that can be sent from RAN controller 116 to RRU 114a for a number of scheduling command periods 'n', 'n+1', 'n+2' and 'n+3'. A one-way link latency plus processing latency 312 can represent the signaling latency that may be present over the fronthaul network 118 for signaling from RAN controller 116 to RRU 114a plus any processing latency that may be present at RRU 114a for processing scheduling commands from RAN controller 116. For example, in one embodiment, RRU 114a via R-MAC 131a/R-MAC Scheduler 132a can decode one or more DCI(s) sent to R-MAC Scheduler 132a via a scheduling command to determine a number of allocated RBs for each of a given MAC PDU for a given subframe configuration and determine whether there are any RB gap(s) available for the for the given subframe configuration to accommodate any set(s) of retransmission MAC PDU(s) that may be queued at the R-MAC 131a/R-MAC Scheduler 132a.

It should be understood that processing latency at RAN controller 116 can be represented as the difference between the tail of the one-way link latency 310 and the head of the link plus processing latency 312; however, the processing latency at RAN controller 116 is not labeled in FIG. 3.

Consider example signaling interactions between RAN controller 116, RRU 114a and UE 110 in which a scheduling command defined in scheduling period 'n' is signaled 304.1 to RRU 114a. RRU 114a via R-MAC 131a/R-MAC Scheduler 132a decodes one or more DCI(s) included in the scheduling command to determine a number of RBs allocated to UE 110a (e.g., based on the subframe configuration) and initiates new DL transmission (Tx) signaling 320.1 to UE 110a via L1 PHY 134a and RF unit 135a over the Uu air interface 129. A four (4) msec delay occurs between DL transmission 320.1 and HARQ NACK signaling 320.2 can be sent back to the RRU 114a indicating that UE 110a was unable to correctly decode DL transmission 320.1.

In one embodiment, RRU 114a can cache (e.g., store in RRU storage 216a) a local copy of the MAC PDU(s) to be sent to UE(s) and a copy of the DCI corresponding to each MAC PDU(s) stored for each UE(s) for each subframe processed at the RRU in the event that any downlink retransmissions are needed. In another embodiment, RRU 114a can cache a local copy of the MAC PDU(s) to be sent to UE(s) without a copy of the DCI corresponding to each MAC PDU(s) and can construct a DCI for a corresponding retransmission MAC PDU, when needed. In either embodiment, following the HARQ NACK signaling at 320.2, RRU 114a via R-MAC 131a/R-MAC Scheduler 132a can store the MAC PDU for UE 110a corresponding to the failed transmission in a retransmission queue, which can be configured for RRU 114a via RRU storage 216a.

In one embodiment, the RB allocation size for the failed transmission can also be stored and associated with the MAC PDU stored in the retransmission queue. Storing an association of RB allocation size for retransmission MAC PDUs stored in the retransmission queue can enable the R-MAC 131a/R-MAC Scheduler 132a to process each scheduling command received from C-MAC 144/C-MAC Scheduler 145 for a particular subframe configuration to determine if an RB gap of an appropriate is present for the particular subframe configuration to accommodate any retransmission MAC PDUs that may be queued at RRU 114a.

Upon queueing the retransmission MAC PDUs, the R-MAC 131a/R-MAC Scheduler 132a can determine whether an indication of the pending downlink retransmission should be signaled to RAN controller 116 at 302.6. In some embodiments, as discussed herein, R-MAC Scheduler 132a can include in DL retransmission status reports an indication of the number of retransmission(s) for each of one or more RB allocation size(s) that may be pending at RRU 114a. In other embodiments, retransmission information included in DL retransmission status reports can relate to BLER percentage, size of the retransmission queue, size of the retransmission queue in relation to a particular threshold, etc., as discussed herein. Thus, the DL retransmission status report signaled at 302.7 may or may not include retransmission information related to the HARQ NACK signaling received at 320.2.

Although not shown in FIG. 3, concurrent with receiving the HARQ NACK signaling 320.2, another new DL transmission can be sent to UE 110a for a scheduling command defined in scheduling period 'n+1'. This DL transmission is not shown in FIG. 3 in order to illustrate HARQ NACK signaling 320.2.

After another 4 msec delay, RRU 114a via R-MAC 131a/R-MAC Scheduler 132a initiates new DL Tx signaling 322 to UE 110a for a scheduling command defined in scheduling period 'n+2' signaled at 304.3. It is assumed for the embodiment of FIG. 3 that either no gaps or no gaps of an appropriate size are available for any retransmission MAC PDUs for the subframe corresponding to the scheduling command for period 'n+2'. Thus, upon receiving the scheduling command for scheduling period 'n+2', RRU 114a can initiate DL Tx signaling 322 rather than retransmission signaling for the HARQ NACK received at 320.2.

Another scheduling command for period 'n+3' is signaled at 304.4 to RRU 114a. For purposes of the embodiment shown in FIG. 3, it is assumed that an RB gap of an appropriate size (e.g., at least equal to the RB allocation size of the retransmission MAC PDU corresponding to the HARQ NACKed transmission for period 'n') is available for the subframe configuration corresponding to the scheduling command for period 'n+3'. In one case, for example, the RB gap associated with the subframe configuration for the scheduling command sent at 304.4 could have been responsive to DL retransmission feedback received at 302.1, etc. received prior to the scheduling command for period 'n+3' being signaled to RRU 114a. In another case, for example, the RB gap associated with the subframe configuration for the scheduling command could be based on a DL retransmission rate configured (or updated via DL retransmission status reports) at the C-MAC 144/C-MAC Scheduler 145 for reserving a number of RB gap(s) of one or more RB allocation size(s) for subframe configurations based on the DL retransmission rate.

RRU 114a via R-MAC 131a/R-MAC Scheduler 132a decodes the scheduling command for period 'n+3' (e.g., decodes DCI(s) in the scheduling command) to determine that an appropriate RB gap of an appropriate size is present for the subframe configuration corresponding to the scheduling command for period 'n+3' to accommodate the retransmission MAC PDU for UE 110a cached at RRU 114a. R-MAC 131a/R-MAC Scheduler 132a can send the cached retransmission MAC PDU and DCI for the corresponding retransmission MAC PDU (e.g., either a cached copy of the DCI received from C-MAC Scheduler 145 for the cached retransmission MAC PDU or a DCI constructed at R-MAC Scheduler 132a for the cached retransmission MAC PDU) to L1 PHY layer 134, which can generate RBs according to DCI(s) for the corresponding subframe (e.g., the DCI for the retransmission MAC PDU and any other DCI(s) for the subframe configuration for any other downlink transmissions scheduled for the subframe) and a downlink retransmission can be initiated at 324 to complete the HARQ retransmission for UE 110a. Thus, as shown in the embodiment of FIG. 3, the system and method provided by communication system 100 can facilitate subframe scheduling in a split MAC RAN environment.

FIGS. 4A and 4B are described with reference to each other to illustrate various features that can be associated with handling uplink transmissions in the split MAC RAN environment of communication system 100. Referring to FIG. 4A, FIG. 4A is a simplified schematic block illustrating other example details associated with the example protocol stack split of FIG. 1B within the split MAC RAN environment of communication system 100 in accordance with one potential embodiment. In particular, FIG. 4 illustrates example details associated with uplink transmissions the can be facilitated by the system and method provided by communication system 100. Although FIG. 4 illustrates RRU 114a, it should be understood that RRU 114b can be configured in a similar manner to provide similar operations as RRU 114a.

RAN controller 116 includes protocol stack 140, which includes GTP-U protocol layer 141, PDCP protocol layer 142, RLC protocol layer 143, C-MAC 144 and C-MAC Scheduler 145. RRU 114a includes protocol stack 130a, which includes R-MAC layer 131a, R-MAC Scheduler 132a, HARQ 133a, L1 PHY layer 134a and RF unit 135a.

The user data plane S1-U interface 124 is provided via backhaul network 120 between one or more elements of EPC 122 and RAN controller 116 via GTP-U layer 141. The control plane S1-MME interface 126 is provided via backhaul network 120 between one or more elements of EPC 122 and RAN controller 116 via RRC layer 146. The data plane interface 127 is provided via fronthaul network 118 between C-MAC layer 144 and R-MAC layer 131a. The control plane interface 128 is provided via fronthaul network 118 between C-MAC Scheduler 145 and R-MAC Scheduler 132a. The Uu air interface 129 can enable data and control exchanges between RRU 114a and a given UE (e.g., UE 110a, 110b). UE 110a is shown in FIG. 4.

During operation in an uplink data scenario, uplink data (e.g., MAC PDUs) for UE 110a contained in transport blocks transmitted by UE 110a are received by RRU 114a via RF unit 135a and L1 PHY layer 134a. The transport blocks are routed to R-MAC layer 131a. R-MAC layer 131a can process the transport blocks into MAC PDUs, which are sent to C-MAC layer 144 via the data plane interface 127. The MAC PDUs can be processed by C-MAC 144 and output to RLC layer 143. RLC 143 can output RLC PDUs to PDCP layer 142, which can output PDCP PDUs to GTP-U layer 141. GTP-U layer 141 can process the PDCP PDUs to output ERABs toward one or more network elements of EPC 122

Scheduling commands can be sent from C-MAC scheduler 145 to R-MAC scheduler 132a via the control plane interface 128. The scheduling commands can include, at least in part, DCI messages for UL grants associated with UL resource allocations. DCI messages associated with UL grants for a given UE can be of a Format 0, which can be denoted herein as 'DCI0(UE X)' for a particular UE X. UL HARQ ACKs/NACKs can be transmitted by RRU 114a via L1 PHY layer 134a and RF unit 135a. Various operations that can be associated with the protocol stack split can be best understood with respect to various signaling interactions that can be associated with uplink transmissions. Such signaling interactions are discussed in more detail with regard to FIG. 4B.

Referring to FIG. 4B, FIG. 4B simplified schematic diagram 400 illustrating example signaling interactions that can be associated with subframe scheduling in accordance with one potential embodiment of communication system 100. FIG. 4B includes UE 110a, RRU 114a and RAN controller 116. It should be understood that signaling interactions between RAN controller 116 and RRU 114a can be facilitated as described herein via C-MAC 144/C-MAC Scheduler 145 and R-MAC 131a/R-MAC Scheduler 132a. Although FIG. 4B is described with reference to RRU 114a and UE 110a, it should be understood that similar signaling interactions can occur between RRU 114b and RAN controller 116 for UE 110c or for any other RRU and UE served thereby, which may be deployed in communication system 100.

The example signaling interactions illustrated in the embodiment of FIG. 4B can represent a 'snapshot' in time of example signaling that can be performed between RAN controller 116, RRU 114a and UE 110a. FIG. 4B illustrates uplink (UL) retransmission status report signaling 402.1-402.8 for communicating UL retransmission status reports from RRU 114a to RAN controller 116. As described for various embodiments herein, UL retransmission status reports can be used by C-MAC 144/C-MAC Scheduler 145 to adapt RB gap reservations for subframe configurations to accommodate uplink RBs sent from UEs (e.g., UE 110a, 110b) served by RRU 114a. One-way link latency 410 can represent the signaling latency that may be present over the fronthaul network 118 for signaling from RRU 114a to RAN controller 116.

Scheduling command signaling 404.1-404.5 is illustrated for a number of scheduling commands that can be sent from RAN controller 116 to RRU 114a for a number of scheduling command periods 'n', 'n+1', 'n+2', 'n+3' and 'n+4'. A one-way link latency plus processing latency 412 can represent the signaling latency that may be present over the fronthaul network 118 for signaling from RAN controller 116 to RRU 114a plus any processing latency that may be present at RRU 114a for processing scheduling commands from RAN controller 116. For example, in one embodiment, RRU 114a via R-MAC 131a/R-MAC Scheduler 132a can decode one or more DCI(s) sent to R-MAC Scheduler 132a to determine a number of allocated RBs for a given subframe configuration and determine whether there are any unallocated RBs available within the subframe configuration that could be used to accommodate any RBs associated with any delayed UL grants that may be queued at the R-MAC 131a/R-MAC Scheduler 132a.

It should be understood that processing latency at RAN controller 116 can be represented as the difference between the tail of the one-way link latency 410 and the head of the link plus processing latency 412; however, the processing latency at RAN controller 116 is not labeled in FIG. 4B.

Consider example signaling interactions between RAN controller 116, RRU 114a and UE 110 in which a scheduling command defined in scheduling period 'n' is signaled 404.1 to RRU 114a. RRU 114a via R-MAC 131a/R-MAC Scheduler 132a decodes one or more DCI(s) included in the scheduling command to determine a number of RBs allocated to UE 110a and/or any other UE(s) for the subframe configuration and initiates signaling 420.1 for an UL grant to UE 110a (e.g., DCIO(UE 110a) via L1 PHY 134a and RF unit 135a over the Uu air interface 129. A four (4) msec delay occurs between UL grant signaling 420.1 and UL transmission signaling 420.2 from UE 110a for the UL grant received at 420.1. Another 4 msec delay can occur between RRU 114a receiving the UL transmission 420.2, determining that it is unable to decode the UL transmission 420.2 and initiating HARQ NACK signaling at 420.3 back to UE 110a.

RRU 114a may receive another UL grant for UE 110a and/or any other UE(s) served by RRU 114a (e.g., UE 110b) for RBs that will contain a retransmission within scheduling period 'n+2', however, this UL grant will be delayed as RRU 114a anticipates receiving an UL retransmission 420.4 within 4 msec of sending the HARQ NACK signaling at 420.3. The delayed UL grant can be stored in an UL grant delay queue via RRU storage 216a and the RB allocation size for the UL grant can also be stored and associated with the delayed UL grant for determining when an RB gap of an appropriate size is available to accommodate the delayed UL transmission for the delayed UL grant. Storing an association of the RB allocation size for delayed UL grant(s) stored in the delay queue can enable the R-MAC 131a/R-MAC Scheduler 132a to process each scheduling command to determine if an appropriate RB gap may be present for any subframe configurations to accommodate the RBs allocated for a corresponding delayed UL grant.

Upon queueing the delayed UL grant, the R-MAC 131a/R-MAC Scheduler 132a can determine whether an indication of the pending UL grant should be signaled to RAN controller 116 at 402.8. In some embodiments, R-MAC Scheduler 132a can include in UL retransmission status reports an indication of the number of delayed UL grant(s) for each of one or more RB allocation size(s) that may be pending at RRU 114a. In other embodiments, retransmission information included in UL retransmission status reports can relate to BLER percentage, per UE BLER percentage, size of the delayed UL grant queue, size of the delayed UL grant queue in relation to a particular threshold, combinations thereof or the like similar to the information that can be included in DL retransmission status reports as discussed herein. Thus, the UL retransmission status report signaled at 402.7 may or may not include retransmission information related to the HARQ NACK signaling transmitted at 420.3.

It is assumed for the embodiment of FIG. 4B that RRU via R-MAC 131a/R-MAC Scheduler 132a correctly decodes the UL retransmission 420.4 and initiates a HARQ ACK transmission 420.5 to confirm correct decoding of the UL retransmission 420.4.

In the meanwhile, it is assumed for the embodiment of FIG. 4B that RRU 114a receives an scheduling command for period 'n+4' that indicates a 'catch up' RB gap of an appropriate size for the subframe configuration at period 'n+4' in order to handle UL transmissions for the delayed UL grant queued at RRU 114a for period 'n+2'. RRU 114a via R-MAC 131a/R-MAC Scheduler 132a decodes one or more DCI(s) included in the scheduling command for period 'n+4' to determine that an RB gap of an appropriate size has been provided for the subframe configuration to accommodate UL transmissions for the delayed UL grant and initiates signaling 422.1 for an UL grant to UE 110a (e.g., DCIO(UE 110a)) via L1 PHY 134a and RF unit 135a over the Uu air interface 129.

In one case, for example, the RB gap associated with the subframe configuration for the scheduling command at period 'n+4' could have been responsive to UL retransmission feedback received at 402.1, etc. received prior to the scheduling command for period 'n+4' being signaled to RRU 114a. In another case, for example, the RB gap associated with the scheduling command could be based on a UL retransmission rate configured (or updated via UL retransmission status reports) at the C-MAC 144/C-MAC Scheduler 145 for reserving a number of RB gap(s) of one or more RB allocation size(s) into subframes based on the UL retransmission rate. In one embodiment, one retransmission rate could be associated with both the rate of DL retransmissions and the rate of delayed UL transmissions occurring at a given RRU.

Following transmission of the delayed UL grant signaled at 422.1, an UL transmission 422.2 from UE 110a corresponding to the delayed UL grant is received by RRU 114a. For the embodiment shown in FIG. 4B it is assumed that the UL transmission 422.2 is correctly decoded at RRU 114a and a HARQ ACK is initiated at 422.3 indicating successful decoding of the UL transmission 422.2. Thus, as shown in the embodiment of FIG. 4B, the system and method provided by communication system 100 can facilitate subframe scheduling in a split MAC RAN environment.

Turning to FIG. 5, FIG. 5 is a simplified flow diagram illustrating example operations 500 that can be associated with subframe scheduling in a split MAC RAN environment in accordance with one potential embodiment of communication system 100. At 502, the operations can include a particular RRU say, for example RRU 114a, receives a scheduling command from a RAN controller (e.g., RAN controller 116) for a particular subframe that provides a subframe configuration (e.g., a number of DCI(s) indicating a number of RBs allocated to one or more UE for the subframe configuration) for the particular subframe.

Although the embodiment of FIG. 5 is discussed with reference to RRU 114a, it should be understood that certain operations can also be performed by RRU 114b similar to that as described for RRU 114a. Further, it should be understood that various operations RRU 114a as discussed for the embodiment of FIG. 5 can be performed via R-MAC 131a/R-MAC Scheduler 132a and/or one or more other protocol layers as discussed herein. In the context of the embodiment of FIG. 5, the scheduling command can provide a subframe configuration that can include uplink and/or downlink RBs allocated for transmission during the particular subframe.

At 504, the operations can include RRU 114a (e.g., via R-MAC 131a/R-MAC Scheduler 132a) determining whether the subframe configuration contains any RB gap(s) for the subframe. As discussed herein, an RB gap for a subframe configuration can correspond to a number of RBs that can be utilized for the subframe to accommodate downlink retransmissions or delayed uplink transmissions. If there are not any RB gap(s) for the subframe configuration, the operations can continue to 512 in which RRU 114a (e.g., via R-MAC Scheduler 132a) generates a retransmission status report and sends the retransmission status report to the RAN controller 116 at 514 and the operations can end. The retransmission status report can include retransmission feedback information as discussed for various embodiments described herein.

However, if there are any RB gap(s) for the subframe configuration, the operations can continue to 506 in which RRU 114a determines size(s) of the RB gap(s) blocks for the subframe configuration. In one embodiment, the operations at 506 can include decoding the DCI(s) included in the scheduling command providing the subframe configuration to determine the number of RBs allocated for the subframe configuration and subtracting the number of RBs allocated for the subframe configuration from the number of RBs available to be scheduled in each subframe (e.g., depending on system bandwidth) to determine the size(s) of RB gap(s) that may be present for the subframe configuration.

At 508, the operations can include RRU 114a whether the size(s) of the RB gap(s) for the subframe configuration is/are greater than or equal to a number of resource blocks previously allocated to any UE served by the RRU for which at least one of a previous downlink transmission has failed or a previous uplink grant has been delayed. If the size(s) of any RB gap(s) for the subframe configuration is/are greater than or equal to a number of any resource blocks previously allocated to any UE served by the RRU for which at least one of a previous downlink transmission has failed or a previous uplink grant has been delayed, the operations can continue to 510 in which RRU 114a can utilize one or more of the RB gap(s) of the subframe configuration to accommodate one or more of a number resource blocks previously allocated to any UE served by the RRU for which at least one of a previous downlink transmission has failed or a previous uplink grant has been delayed.

In one embodiment, say in a downlink scenario, for example, utilizing a particular RB gap for a particular subframe can include utilizing the RB gap to accommodate at least one retransmission MAC PDU corresponding to a number of previously allocated resources blocks of an appropriate size (e.g., a size less than or equal to the RB gap size) queued at the RRU for at least one UE for which a previous downlink transmission has failed. The at least one retransmission MAC PDU and a DCI corresponding to the at least one retransmission MAC PDU can be sent to the L1 PHY layer 134a along with any other MAC PDUs and DCI(s) scheduled for the subframe. The L1 PHY layer 134a can generate RBs according to DCI(s) for the corresponding subframe configuration (e.g., a DCI for the at least one retransmission MAC PDU and any other DCI(s) for the subframe configuration for any other scheduled downlink transmission(s)) and the at least one downlink retransmission and/or any other scheduled downlink transmission(s) scheduled can be initiated via RF unit 135a for any UE served by RRU 114a (e.g., UE 110a-110b).

In another embodiment, say in an uplink scenario, for example, utilizing a particular RB gap for a particular subframe configuration can include utilizing the RB gap to accommodate at least one uplink transmission for a number of previously allocated resource blocks of an appropriate size for at least one uplink grant that has been queued at the RRU due to preemption by one or more uplink retransmissions.

Following the operations at 510, the operations can continue to 512 in which RRU 114a generates a retransmission status report and sends the retransmission status report to the RAN controller 116 at 514 and the operations can end.

In various embodiments, the solution provided by communication system 100 may provide several advantages over split RAN systems that rely on centralized HARQ handling or that rely on RAN controller re-scheduling for failed uplink or downlink transmissions. In various embodiments, these advantages can include, but not be limited to: circumventing delays that would be introduced by round-trip signaling while minimizing throughput penalties; providing for deterministic scheduling from the perspective of the RAN controller; providing for low latency downlink retransmissions associated with downlink NACKs and/or delayed transmissions associated with uplink NACKs to be carried out remotely; and minimizing errors and/or inefficiencies that can be introduced by under/over utilization of the air interface for both uplink and downlink communications.

Note that in this Specification, references to various features (e.g., elements, structures, modules, components, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module as used herein this Specification, can be inclusive of an executable file comprising instructions that can be understood and processed on a computer, and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrases 'at least one of' or 'one or more of' refers to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 100 may be applicable to other exchanges or routing protocols. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving a scheduling command for a subframe at a Remote Radio Unit (RRU), wherein the scheduling command provides a subframe configuration for the subframe;
   determining whether the subframe configuration comprises at least one resource block gap for the subframe;
   upon determining the subframe configuration comprises a resource block gap, utilizing the at least one resource block gap to accommodate one or more previously allocated resource blocks for one or more user equipment served by the RRU for which at least one of a previous downlink transmission has failed or a previous uplink grant has been delayed; and
   reserving, by a Radio Access Network (RAN) controller, one or more resource block gaps within one or more subframes according to a first resource block gap reservation rate.

2. The method of claim 1, wherein the subframe configuration is associated with downlink transmissions for one or more user equipment served by the RRU.

3. The method of claim 1, wherein the subframe configuration is associated with uplink transmissions for one or more user equipment served by the RRU.

4. The method of claim 1, wherein the scheduling command comprises one or more Downlink Control Information (DCI) messages and wherein each respective DCI message corresponds to a respective user equipment having one or more resource blocks allocated for the subframe.

5. The method of claim 4, wherein determining whether the subframe configuration comprises at least one resource block gap is based, at least in part, on the one or more DCI messages included the scheduling command.

6. The method of claim 1, further comprising:
   generating a retransmission status report at the RRU; and
   sending the retransmission status report to the RAN controller.

7. The method of claim 6, further comprising:
   updating the first resource block gap reservation rate to a second resource block gap reservation rate based on retransmission feedback information included in the retransmission status report.

8. The method of claim 1, wherein a resource block gap is restricted to a predetermined number of resource blocks.

9. One or more non-transitory tangible media encoding logic that includes instructions for execution that when executed by a processor, is operable to perform operations comprising:
   receiving a scheduling command for a subframe at a Remote Radio Unit (RRU), wherein the scheduling command provides a subframe configuration for the subframe;
   determining whether the subframe configuration comprises at least one resource block gap for the subframe;
   upon determining the subframe configuration comprises at least one resource block gap, utilizing the at least one resource block gap to accommodate one or more previously allocated resource blocks for one or more user equipment served by the RRU for which at least one of a previous downlink transmission has failed or a previous uplink grant has been delayed; and
   reserving, by a Radio Access Network (RAN) controller, one or more resource block gaps within one or more subframes according to a first resource block gap reservation rate.

10. The media of claim 9, wherein the subframe configuration is associated with downlink transmissions for one or more user equipment served by the RRU.

11. The media of claim 9, wherein the subframe configuration is associated with uplink transmissions for one or more user equipment served by the RRU.

12. The media of claim 9, wherein the scheduling command comprises one or more Downlink Control Information (DCI) messages and wherein each respective DCI message corresponds to a respective user equipment having one or more resource blocks allocated for the subframe.

13. The media of claim 12, wherein determining whether the subframe configuration comprises at least one resource block gap is based, at least in part, on the one or more DCI messages included the scheduling command.

14. The media of claim 9, the operations further comprising:
  generating a retransmission status report at the RRU; and
  sending the retransmission status report to the RAN controller.

15. The media of claim 14, the operations further comprising:
  updating the first resource block gap reservation rate to a second resource block gap reservation rate based on retransmission feedback information included in the retransmission status report.

16. The media of claim 9, wherein a resource block gap is restricted to a predetermined number resource blocks.

17. A system, comprising:
  a memory element for storing data; and
  a processor that executes instructions associated with the data, wherein the processor and the memory element cooperate such that the system is configured for:
    receiving a scheduling command for a subframe at a Remote Radio Unit (RRU), wherein the scheduling command provides a subframe configuration for the subframe;
    determining whether the subframe configuration comprises at least one resource block gap for the subframe;
    upon determining the subframe configuration comprises at least one resource block gap, utilizing the at least one resource block gap to accommodate one or more previously allocated resource blocks for one or more user equipment served by the RRU for which at least one of a previous downlink transmission has failed or an uplink grant has been delayed; and
    reserving, by a Radio Access Network (RAN) controller, one or more resource block gaps within one or more subframes according to a first resource block gap reservation rate.

18. The system of claim 17, wherein the system is further configured for:
  updating the first resource block gap reservation rate based, at least in part, on one or more retransmission status reports received from the RRU.

* * * * *